United States Patent
Watanabe

(10) Patent No.: US 9,413,728 B2
(45) Date of Patent: Aug. 9, 2016

(54) IDENTIFYING CONTENT FROM AN ENCRYPTED COMMUNICATION

(71) Applicant: GLOBALFOUNDRIES INC., Grand Cayman (KY)

(72) Inventor: Yuji Watanabe, Tokyo (JP)

(73) Assignee: GLOBALFOUNDRIES INC., Grand Cayman (KY)

(*) Notice: Subject to any disclaimer, the term of this patent is extended or adjusted under 35 U.S.C. 154(b) by 44 days.

(21) Appl. No.: 14/446,710

(22) Filed: Jul. 30, 2014

(65) Prior Publication Data
US 2015/0039882 A1 Feb. 5, 2015

(30) Foreign Application Priority Data

Aug. 1, 2013 (JP) .................................. 2013160560

(51) Int. Cl.
*H04L 29/06* (2006.01)
*G06F 17/30* (2006.01)

(52) U.S. Cl.
CPC ...... *H04L 63/0428* (2013.01); *G06F 17/30241* (2013.01); *H04L 63/30* (2013.01)

(58) Field of Classification Search
CPC .............. H04L 63/0428; H04L 63/30; G06F 17/30241
USPC ................................................. 713/153, 154
See application file for complete search history.

(56) References Cited

U.S. PATENT DOCUMENTS

| 6,065,046 A * | 5/2000 | Feinberg | G06F 9/44521 |
| | | | 709/216 |
| 8,432,808 B1 * | 4/2013 | Dankberg | H04L 67/325 |
| | | | 370/235 |

(Continued)

FOREIGN PATENT DOCUMENTS

| JP | 2001510662 A | 7/2001 |
| JP | 2006301969 A | 11/2006 |

(Continued)

OTHER PUBLICATIONS

Watanabe, Yuji, "Identifying Device, Identifying Method and Program", Japanese Patent Application 2013-160560, Filed Aug. 1, 2013.

*Primary Examiner* — Sarah Su
(74) *Attorney, Agent, or Firm* — Scully Scott Murphy and Presser

(57) ABSTRACT

Provided is an identifying device for identifying request content from an encrypted request to a server, the identifying device including: a target acquiring unit for acquiring the data size of an encrypted response returned from the server for the encrypted request to the server to be identified; a candidate acquiring unit for acquiring the data size of each of a plurality of encrypted response candidates returned by the server in response to a plurality of encrypted request candidates to be identified sent to the server corresponding to a plurality of known request content candidates; and an identifying unit for identifying the request content to be identified from the plurality of request candidates on the basis of results obtained by comparing the data size of an encrypted response for an encrypted request to be identified to the data sizes of a plurality of encrypted response candidates.

9 Claims, 14 Drawing Sheets

(56) References Cited

U.S. PATENT DOCUMENTS

| | | | | |
|---|---|---|---|---|
| 2004/0257857 | A1* | 12/2004 | Yamamoto | G03F 3/061 365/154 |
| 2006/0280437 | A1* | 12/2006 | Logan | H04N 5/765 386/230 |
| 2012/0213496 | A1* | 8/2012 | Rothschild | H04N 21/2402 386/326 |
| 2012/0266200 | A1* | 10/2012 | Dasher | H04N 21/2396 725/93 |
| 2014/0338001 | A1* | 11/2014 | Zhang | G06F 21/6218 726/28 |
| 2014/0368601 | A1* | 12/2014 | deCharms | H04W 4/021 348/14.02 |
| 2015/0312255 | A1* | 10/2015 | Libonate | H04L 63/0876 713/168 |

FOREIGN PATENT DOCUMENTS

| | | |
|---|---|---|
| JP | 2009200614 A | 9/2009 |
| JP | 5128051 B2 | 1/2013 |

* cited by examiner

IDENTIFYING CONTENT FROM AN ENCRYPTED COMMUNICATION

CROSS-REFERENCE TO RELATED PATENT APPLICATION(S)

Pursuant to 35 U.S.C. §119, the present application claims priority to Japanese Application No. 2013-160560, filed Aug. 1, 2013, the entire contents of which are incorporated herein by reference.

BACKGROUND OF THE INVENTION

The present invention relates generally to the field of encrypted communications, and more particularly to identifying the content of encrypted communications.

SUMMARY

A first aspect of the present invention is an identifying device for identifying request content from an encrypted request to a server, in which the identifying device includes a target acquiring unit for acquiring the data size of an encrypted response returned from the server for the encrypted request to the server to be identified; a candidate acquiring unit for acquiring the data size of each of a plurality of encrypted response candidates returned by the server in response to a plurality of encrypted request candidates to be identified sent to the server corresponding to a plurality of known request content candidates; and an identifying unit for identifying the request content to be identified from the plurality of request candidates on the basis of results obtained by comparing the data size of an encrypted response for an encrypted request to be identified to the data sizes of a plurality of encrypted response candidates. Also provided are a program used by the identifying device, and a method executed by the identifying device.

This summary of the present invention is not intended to enumerate all of the required characteristics of the present invention. The present invention may be realized by any combination or sub-combination of these characteristics.

DETAILED DESCRIPTION

The following is an explanation of the present invention with reference to an embodiment of the present invention. However, the present embodiment does not limit the present invention in the scope of the claims. Also, all combinations of characteristics explained in the embodiment are not necessarily required in the technical solution of the present invention.

There is no known method in which encrypted communication between clients and servers is monitored to identify the content of client requests from the content of the encrypted communication when requests cannot be received directly from clients.

Figure 1:
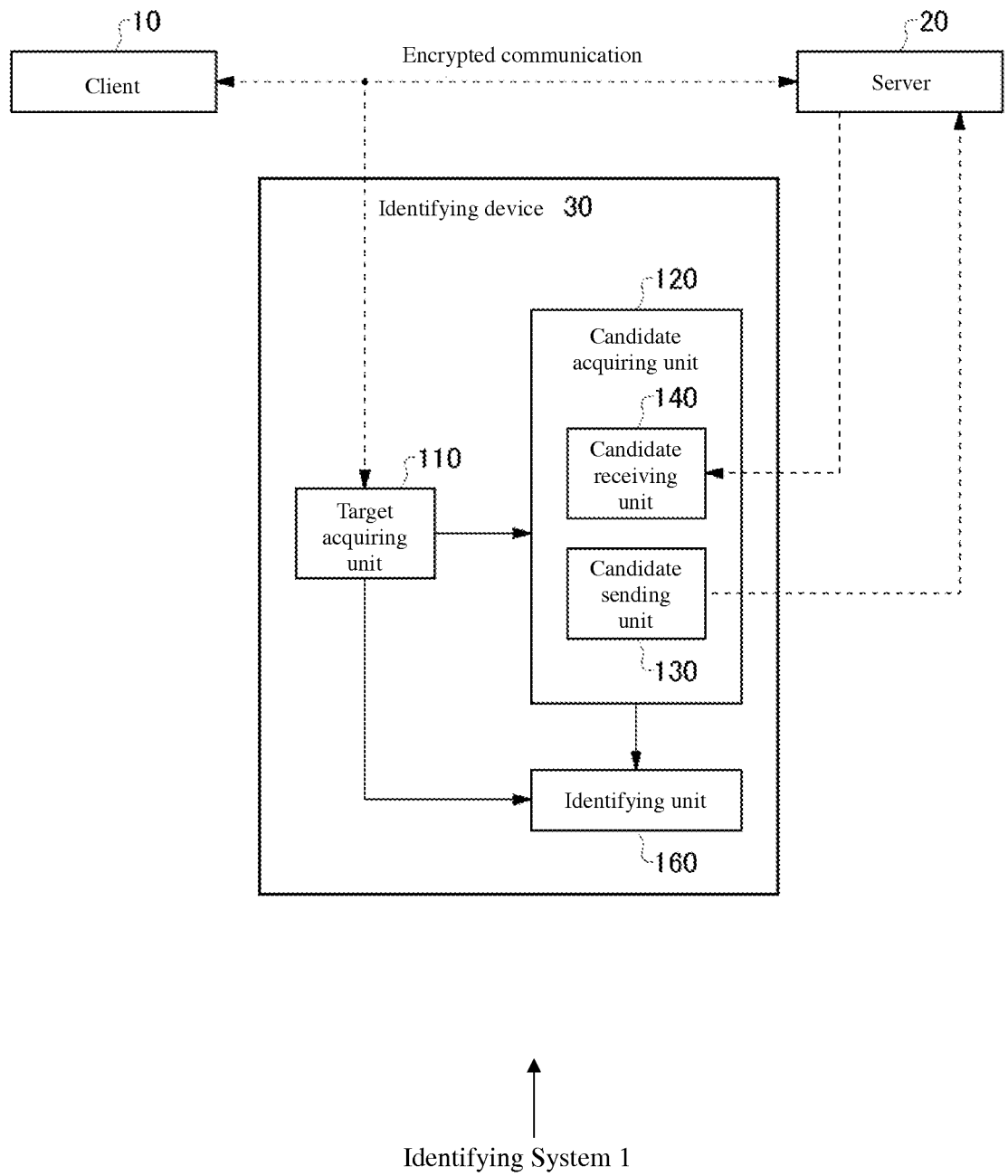
FIG. 1 shows the identifying system in the present embodiment.

FIG. 1 shows the identifying system in the present embodiment. The identifying system 1 includes a client 10, a server 20, and an identifying device 30 in which the content of encrypted communication between the client 10 and the server 20 is identified by the identifying device 30.

The client 10 may be a portable data terminal, a mobile telephone, or a computer such as a desktop or laptop computer which performs encrypted communication with the server 20. For example, the client 10 may send an encrypted request to the server 20, and receive an encrypted response to the encrypted request from the server 20. The client 10 may send a plurality of encrypted requests to the server 20, and receive a plurality of encrypted responses from the server 20.

The server 20 may be a server computer which performs encrypted communication with a client 10. Alternatively, the server 20 may be any computer functioning as a server 20 in communication with a client 10. For example, the server 20 receives encrypted requests from a client 10 and an identifying device 30, and processes the requests. The server 20 then sends the results of the processed request to the client 10 and the identifying device 30.

In one example, the server 20 may be a map server which receives encrypted requests corresponding to request content including location information from clients 10, and returns encrypted responses including map data for the location specified by the location information to clients 10. In another example, the server 20 may be a search server which receives encrypted requests corresponding to request content including search terms, and returns encrypted responses including at least some of the search terms. In still another example, the server 20 may be a computer providing various types of services in which encrypted responses are returned with a data length corresponding to the requested content in an encrypted request.

The identifying device 30 may be a gateway server connecting client 10 to a network external to the client 10, or a server installed, for example, by a mobile communication provider inside a network. The identifying unit 30 acquires encrypted communication between a client 10 and a server 20, and identifies the requested content in encrypted requests made of the server 20 by the client 10. The identifying device 30 includes a target acquiring unit 110, a candidate acquiring unit 120, and an identifying unit 160.

The target acquiring unit 110 acquires the data size of an encrypted response returned by the server 20 in response to an encrypted request to be identified from the client 10 to the server 20. The target acquiring unit 110 may also acquire the response time of an encrypted response from the server to the encrypted request to be identified. The target acquiring unit 110 supplies the acquired data size and response time for an encrypted response to the candidate acquiring unit 120 and the identifying unit 160.

In response to receiving the data size of an encrypted response from the target acquiring unit 110, the candidate acquiring unit 120 sends to the server 20 a plurality of encrypted request candidates corresponding to known request candidate content as request content candidates from the client 10 to the server 20, and acquires the data size for each of the encrypted response candidates returned by the server 20 in response to a plurality of encrypted candidate requests. The candidate acquiring unit 120 may also acquire the response times of each of the encrypted response candidates returned by the server 20 in response to a plurality of encrypted request candidates.

The candidate acquiring unit 120 may include a candidate sending unit 130 and a candidate receiving unit 140. Here, the candidate sending unit 130 sends to the server 20 a plurality of encrypted request candidates corresponding to known candidate request content as candidates to be identified. For example, the candidate sending unit 130 may send to the server 20 the encrypted request candidates corresponding to all encrypted requests sent to the server 20 from a client 10.

For example, the candidate sending unit 130 sends to the server 20 a plurality of encrypted request candidates corresponding to known location information candidates (for example, all location information on a map) when the server 20 is a map server, and sends to the server 20 a plurality of encrypted request candidates corresponding to known search term candidates (for example, all alphabetically generatable character strings) when the server 20 is a search server.

The candidate receiving unit 140 receives a plurality of encrypted response candidates returned by the server 20 in response to encrypted request candidates. The candidate acquiring unit 120 supplies the acquired data sizes to the identifying unit 160.

The identifying unit 160 identifies one or more request content candidates on the basis of the results of a comparison of the data size of an encrypted response to the encrypted request to be identified that was acquired from the target acquiring unit 110, and the data sizes of each of a plurality of encrypted response candidates that were acquired from the candidate acquiring unit 120. For example, the identifying unit 160 identifies, as the encrypted request to be identified, any encrypted request candidate corresponding to an encryption response candidate whose data size matches or substantially matches that of any encrypted response among the plurality of encrypted response candidates.

For example, when the server 20 is a map server, the identifying unit 160 identifies location information included in the encrypted request to be identified among the known location information candidates on the basis of the results of a comparison of the data size of the encrypted response to the encrypted request to be identified to the data sizes of each of the encryption response candidates returned for known location information candidates.

Also, when the server 20 is a search server, the identifying unit 160 identifies a search term included in the encrypted request to be identified among the known search term candidates on the basis of the results of a comparison of the data size of the encrypted response to the encrypted request to be identified to the data sizes of each of the encryption response candidates returned for known search term candidates.

In addition to the data sizes of encrypted responses to encrypted requests, the identifying unit 160 may identify request content in an encrypted request to be identified on the basis of the request time for the encrypted response to the encrypted request and the response times of each of the encrypted response candidates.

Thus, the identifying device 30 in the present invention identifies the content of encrypted requests on the basis of the data size of the encrypted response to the encrypted request without actually decoding the content of the encoded request. In this way, the identifying device 30 can be used to identify request content from the data size of an encrypted transmission from the user, including, for example, the location of a user when the user of the client 10 is involved in an emergency situation. The device can be used for other purposes such as gathering clues.

Figure 2:
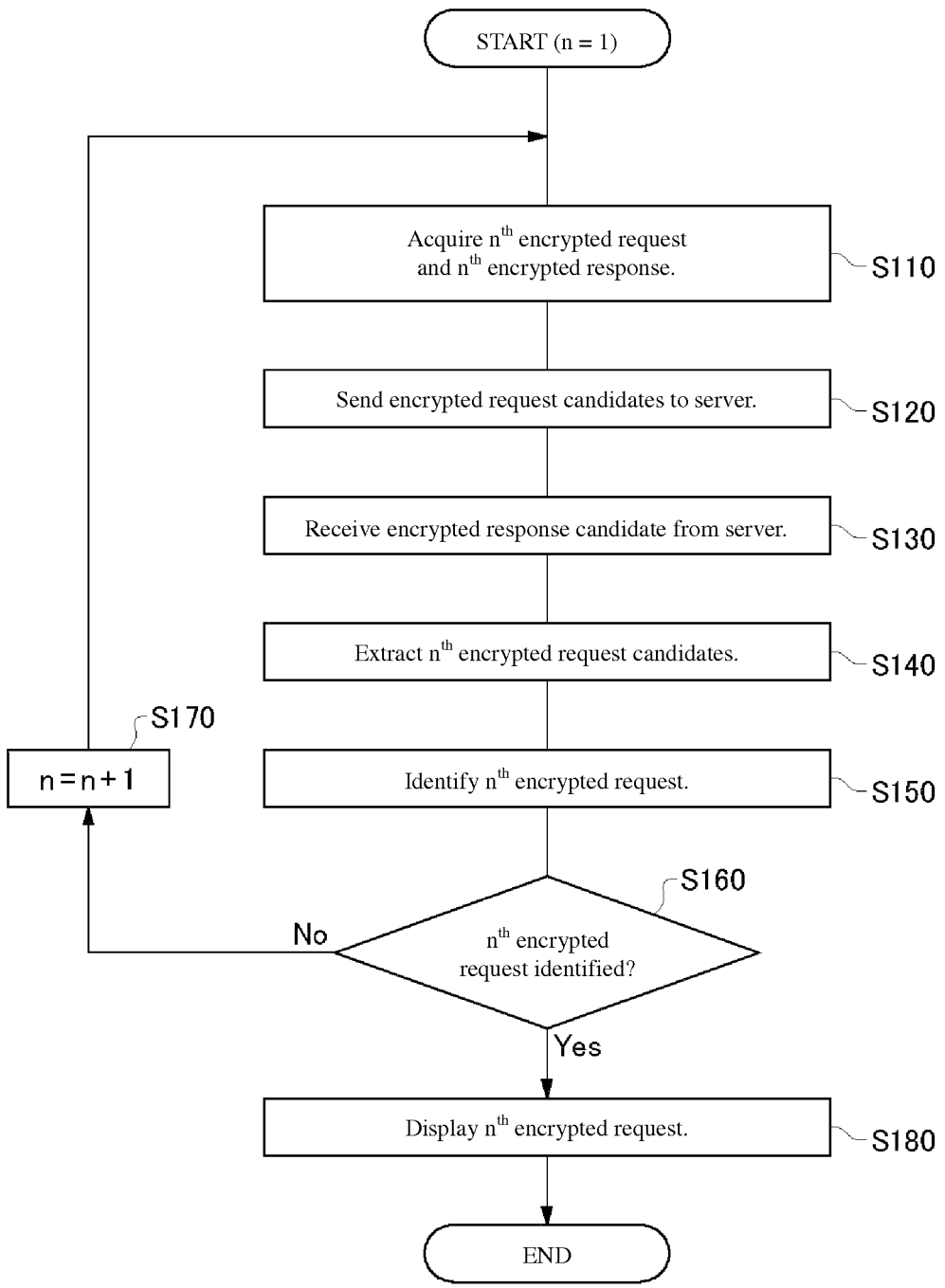
FIG. 2 shows the operational flow of the identifying device in the present embodiment.

FIG. 2 shows the operational flow of the identifying device 30 in the present embodiment. In the present embodiment, the identifying device 30 executes the process in Steps S110 through S180. The identifying device 30 in the present embodiment acquires the data size of the $n^{th}$ encrypted response sent from the server 20 in response to the $n^{th}$ encrypted message sent from the client 10 to the server 20, and identifies the content sent from the client 10 of the $n^{th}$ encrypted request to be identified. The identifying device 30 initiates the process using n=1. (Here, n is an integer equal to or greater than 1.)

First, in Step S110, the target acquiring unit 110 acquires the $n^{th}$ encrypted response returned from the server 20 for the $n^{th}$ encrypted request to be identified sent from the client 10 to the server 20. The target acquiring unit 110 acquires the data size of the encrypted response by reading the header of the packet of the acquired $n^{th}$ encrypted response or by directly measuring the data size of the packet. The target acquiring unit 110 may acquire a single $n^{th}$ encrypted response or several sets of $n^{th}$ encrypted responses to a single $n^{th}$ encrypted request to obtain a single data size or several sets of data sizes.

Also, the target acquiring unit 110 may also acquire the response time for the $n^{th}$ encrypted response from the server to the $n^{th}$ encrypted request to be identified. The target acquiring unit 110 supplies the data size and the response time of the acquired $n^{th}$ encrypted response to the identifying unit 160.

For example, the target acquiring unit 110 may acquire an $n^{th}$ encrypted response of encrypted map information returned by a map server 20 and the data size of the response. Also, the target acquiring unit 110 may acquire a first encrypted response of one or more character string candidates including a search term returned by a search server 20 and the data size of the response.

When the data size of the $n^{th}$ encrypted response is outside of a predetermined range, the target acquiring unit 110 does not have to acquire the data size of the $n^{th}$ encrypted response. In this way, the target acquiring unit 110 can disregard $n^{th}$ encrypted responses of data which is clearly not to be targeted.

Next, in Step 120, in response to acquiring the data size from the target acquiring unit 110, the candidate sending unit 130 in the candidate acquiring unit 120 sends one or more encrypted response candidates to the server 20 which are candidates for the response content sent from the client 10 to the server 20. For example, the candidate sending unit 130 may send a plurality of encrypted responses corresponding to known location information candidates to a map server 20. Also, the candidate sending unit 130 may send encrypted responses corresponding to known search term candidates to a search server 20.

Next, in Step S130, the candidate receiving unit 140 in the candidate acquiring unit 120 receives encrypted response candidates returned by the server 20 for one or more encrypted request candidates sent in Step S120. The candidate acquiring unit 120 acquires the data size of an encrypted response candidate from, for example, the header of the packet of the encrypted response candidate. The candidate acquiring unit 120 may also acquire the response time extending from the sending of the encrypted response candidate to the return of an encrypted response candidate by the server 20.

The candidate receiving unit 140 may receive an encrypted response candidate or sets of encrypted response candidates for a single encrypted request candidate and, in response, may acquire a data size or sets of data sizes for a single encrypted request candidate.

For example, the candidate acquiring unit 120 may acquire an encrypted response candidate of encrypted map information returned by a map server 20 and the data size of the response. Also, the candidate acquiring unit 120 may acquire an encrypted response candidate of one or more character string candidates including a search term returned by a search server 20 and the data size of the response.

Next, in Step S140, the identifying unit 160 identifies an $n^{th}$ encrypted request or $n^{th}$ encrypted request candidate. For example, the identifying unit 160 narrows the request content candidates for the $n^{th}$ encrypted request from the request content candidates for a plurality of encrypted response candidates on the basis of the results of a comparison of the data size of the $n^{th}$ encrypted response to the $n^{th}$ encrypted request to be identified acquired from the target acquiring unit 110, to the data size of each of one or more encrypted response candidates acquired from the candidate acquiring unit 120.

For example, the identifying unit 160 identifies an $n^{th}$ encrypted response candidate whose data size matches or substantially matches that of any $n^{th}$ encrypted response among the plurality of encrypted response candidates. The identifying unit 160 may identify one or more $n^{th}$ encrypted response candidates among a plurality of encrypted response candidates.

When the server 20 encrypts data corresponding to an encrypted request to generate an encrypted response, the data size of the encrypted response may be somewhat larger or somewhat smaller due to the random number used in the encryption process. Therefore, the identifying unit 160 may use an encrypted response candidate as the $n^{th}$ encrypted response candidate, when there is an exact match between the data size of the $n^{th}$ encrypted response and the encrypted response candidate, as well as when there is a substantial match between both data sizes within a predetermined margin (for example, ±0.1 to 1% or ±16 B to 1 kB).

Next, in Step S150, the identifying unit 160 identifies the $n^{th}$ encrypted request. When the $n^{th}$ encrypted request candidates have been narrowed to a single candidate in Step S140, the identifying unit 160 identifies the single candidate as the $n^{th}$ encrypted request.

When the $n^{th}$ encrypted request candidates have been narrowed to several candidates in Step S140, the identifying unit 160 may identify the $n^{th}$ encrypted request in the several $n^{th}$ encrypted request candidates on the basis of at least one of the first through $i^{th}$ requests prior to the $n^{th}$ encrypted request (where i is an integer satisfying the equation $1 \leq i < n$).

For example, the identifying unit 160 may identify the $n^{th}$ encrypted request by combining previously narrowed first through $i^{th}$ requests and/or first through $i^{th}$ request candidates with the $n^{th}$ encrypted request candidates. In one example, the identifying unit 160 may select combinable sets of first request content and second request content from among combinations of previously narrowed first and second request content candidates.

When a single $n^{th}$ encrypted request cannot be identified from the $n^{th}$ encrypted request candidates, the identifying unit 160 may advance to the next step without identifying the $n^{th}$ encrypted request.

Next, in Step S160, the identifying unit 160 determines whether or not the $n^{th}$ encrypted request has been identified. When the $n^{th}$ encrypted request has been identified, the identifying unit 160 advances the process to Step S180. If not, it advances the process to Step S170.

In Step S170, the identifying unit 160 adds "1" to n, and returns the process to Step S110. In this way, the identifying device 30 executes the processing of the next encrypted request between the client 10 and the server 20.

In Step S180, the identifying unit 160 may display on the display screen of the identifying device 30 the $n^{th}$ encrypted request identified in Step S160 along with the corresponding $n^{th}$ encrypted response. For example, the identifying unit 160 displays on the display screen the request content of the encrypted request identified in Step S150 as the $n^{th}$ encrypted request, as well as the response content of the encrypted response candidate corresponding to the encrypted request candidate.

When the first through $i^{th}$ encrypted responses have already been identified, the identifying unit 160 may also display the first through $i^{th}$ encrypted requests and first through $i^{th}$ encrypted responses. The identifying unit 160 may then end the process, or advance the process to Step S170 and execute processing for the next encrypted request and encrypted response.

In this way, the identifying device 30 executes the process in Steps S110 through S180 to identify the content of an encrypted request on the basis of the data size of the encrypted response to the encrypted request.

Note that the identifying device 30 may execute the processing in Steps S120 and S130 prior to Step S110. In this way, the identifying device 30 can obtain the data sizes of many encrypted request candidates beforehand and improve the accuracy of encrypted response identification. The identifying device 30 may also omit Steps S120 and S130 in the second and successive iterations of the process (n≥2).

The identifying device 30 may execute a loop including Steps S110 through S160 each time a client 10 sends an $n^{th}$ encrypted request and receives an $n^{th}$ encrypted response from the server 20 or, alternatively, may execute Steps S110 through S180 after previously acquiring a log of $n^{th}$ encrypted requests and $n^{th}$ encrypted responses.

The data size of the $n^{th}$ encrypted response changes depending on the model of the client 10 device. In order to address these changes in data size, the identifying unit 160 in the identifying device 30 may execute a predetermined correction process on the data size of the $n^{th}$ encrypted response acquired by the target acquiring unit 110 on the basis of the model of the client 10 device.

Figure 3:
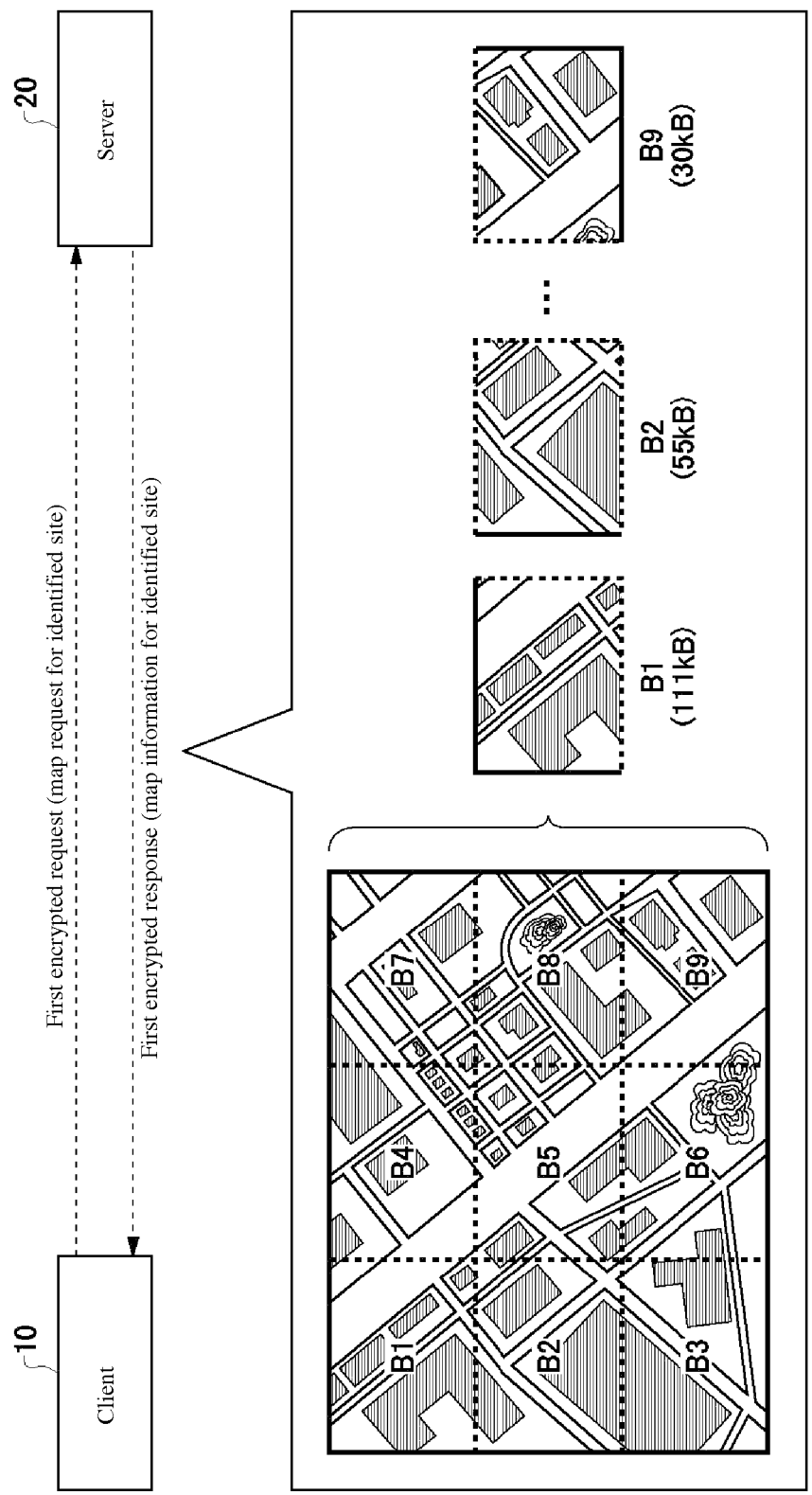
FIG. 3 shows an example of a first encrypted request and a first encrypted response when the server is a map server.

FIG. 3 through FIG. 7 show an example of the processing performed by the identifying system when the server 20 is a map server. FIG. 3 shows an example of a first encrypted request and a first encrypted response. The first time the processing in Step S110 is performed (n=1), a client 10 sends to the map server 20 a first encrypted request containing location information and request content which is map data for a particular location corresponding to the location information. The client 10 may send, for example, address data or map coordinate data to the server 20.

The server 20 receives a first encrypted request corresponding to request content including location information from the client 10, decodes the first encrypted request and extracts the location information included in the request content, and acquires map data for the location specified by the location information from a database. The server 20 encrypts the acquired map data, and returns a first encrypted response including the encrypted map data to the client 10.

Here, the server 20 may also send to the client 10 map data corresponding to one or more adjacent map blocks centered on the location specified by the location information, or may send to the client 10 a plurality of first encrypted responses corresponding to the plurality of map blocks. For example, the server 20 may send to the client 10 map data corresponding to each of adjacent map blocks B1-B9 as nine first encrypted responses. Each of the nine first encrypted responses may have a different data size.

The client 10 may receive and decrypt the first encrypted responses corresponding to map blocks B1-B9, and generate and present to the user a single map created from map blocks B1-B9. The target acquiring unit 110 acquires the first encrypted responses, and acquires the data sizes of each of the first encrypted responses.

The first time the processing in Step S120 is performed, the candidate sending unit 130 sends to the server 20 the plurality of encrypted response candidates corresponding to known location information as candidates for request content sent from the client 10 to the server 20.

The candidate sending unit 130 may request map data from the server 20 related to the candidate locations in the maps expressed at a different scale in the server 20 by sending to the server 20 known location information candidates and encrypted request candidates corresponding to scale information candidates.

For example, the candidate sending unit 130 may send to the server 20 a plurality of encrypted request candidates related to large-scale map data and small-scale map data from the server 20. Also, the candidate sending unit 130 may send to the server a plurality of encrypted request candidates covering an entire area related to all map scales acquirable from the server 20.

Also, the candidate sending unit 130 may request from the server 20 as encrypted request candidates map data corresponding to a location with a high probability of being requested by the client 10. For example, the candidate sending unit 130 may send to the server 20 an encrypted request candidate corresponding to an encrypted request identified in the past by the identifying unit 160. Also, the candidate sending unit 130 may request from the server 20 map data corresponding to a location related to attributes such as the nationality, residential address, place of work and/or vacation site of the client 10.

The server 20 may decrypt each encrypted request candidate, acquire location information included in the request content, and send to the identifying device 30 a plurality of encrypted response candidates corresponding to the plurality of adjacent map blocks centered on the location specified by the location information.

The first time the processing in Step S130 is performed, the candidate acquiring unit 120 acquires the data size of each of the plurality of encrypted responses returned by the server 20. For example, the candidate receiving unit 140 of the candidate acquiring unit 120 acquires encrypted response candidates including map data related to all map blocks. In one example, the candidate receiving unit 140 acquires a plurality of encrypted response candidates including map data for map blocks corresponding to known location information candidates and scale information candidates from the server 20, and extracts the data sizes of each encrypted response candidate.

Figure 4:
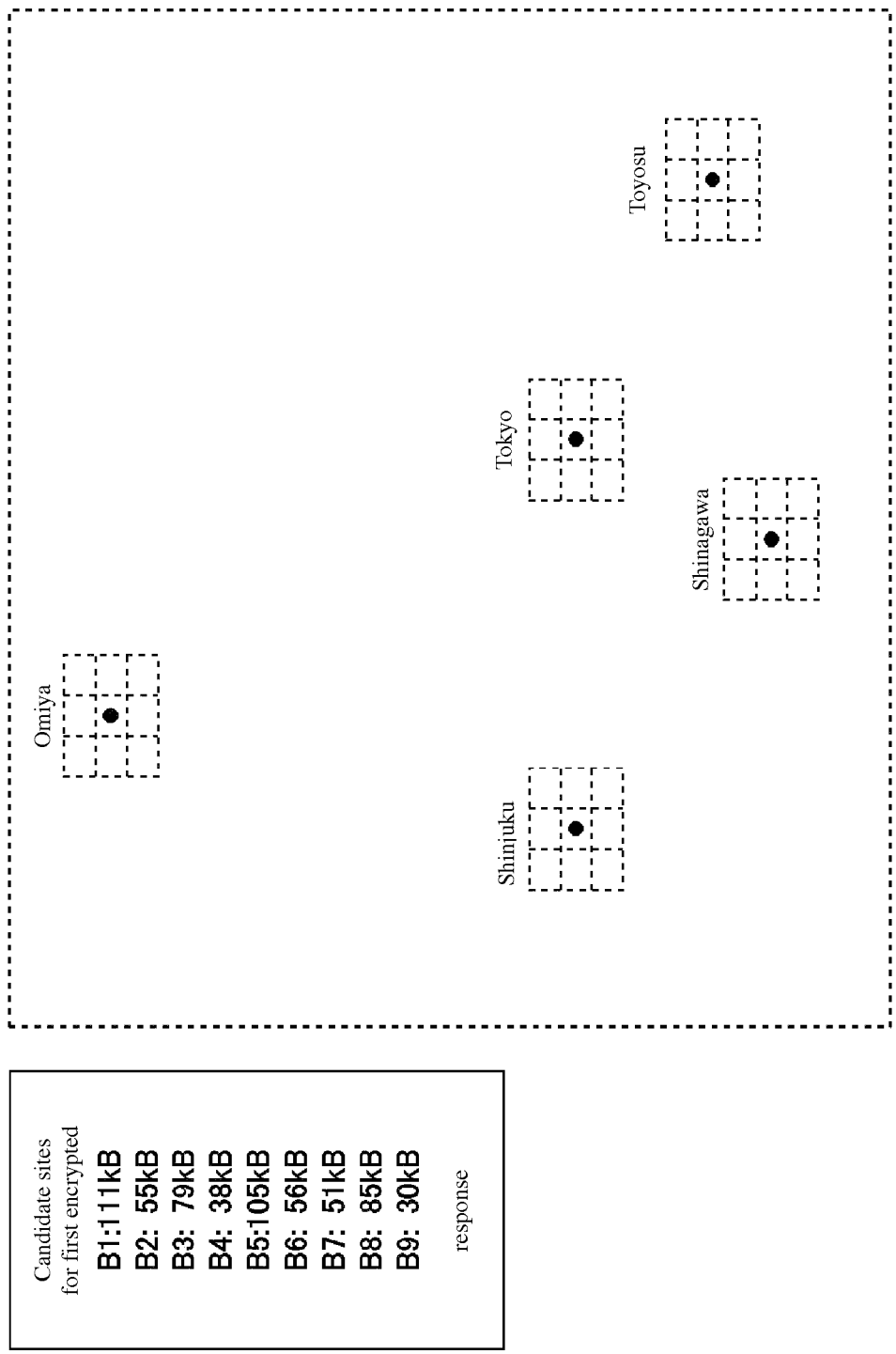
FIG. 4 shows an example of the processing performed by the identifying unit to identify candidates for the first encrypted response.

FIG. 4 shows an example of the processing performed by the identifying unit 160 to identify first encrypted response candidates. The first time the processing in Step S140 is performed, the identifying unit 160 narrows the first location information candidates included in the first encrypted request to be identified from known location information candidates on the basis of the results of a comparison of the data size of the first encrypted response to the first encrypted request to be identified, and the data sizes of each of the encrypted response candidates returned for known location information candidates.

For example, the identifying unit 160 narrows, as the first location information candidate related to the first encrypted request, the locations related to the plurality of encrypted request candidates to candidate locations related to encrypted request candidates that can be acquired from the server 20 as sets of encrypted responses matching the data size of a plurality of first encrypted response sets.

When, for example, the target acquiring unit 110 in Step S110 has received a plurality of first encrypted responses with data sizes 111 kB (B1), 55 kB (B2), 79 kB (B3) and 30 kB (B9) as shown in FIG. 4, the identifying unit 160 narrows, as candidate locations in the first location information related to the first encrypted request, the plurality of location information candidates to locations around Omiya, Shinjuku, Tokyo, Shinagawa and Toyosu acquired, respectively, in encrypted response candidates with a data size of 111 kB, 55 kB, 79 kB, and 30 kB.

Users of clients 10 sometimes request small-scale map data after first requesting large-scale map data from the server 20 and confirming a location, such as their current location, on the large map. In order to address these situations, the identifying unit 160 may prioritize the narrowing of the candidate locations related to the first location information to location information candidates related to large-scale map data when the candidate receiving unit 140 has received location information related to large-scale map data and location information related to small-scale map data as a plurality of location information candidates.

The second time Step S110 is performed, the client 10 sends to the map server 20 a second encrypted request including location information and map data for a geographic point corresponding to this location information as the request content.

The server 20 receives the second encrypted request corresponding to request information including location information from the client 10, decrypts the second encrypted request, extracts the location information included in the request content, and acquires map data for the location specified by the location information from a database. The server 20 returns to the client 10 a second encrypted response including this acquired map data.

The server 20 may send to the client map data corresponding to each of a plurality of adjacent map blocks B10-B18 as nine second encrypted responses. The second encrypted responses corresponding to map blocks B10-B18 each have a different data size.

The client 10 receives and decrypts the second encrypted responses corresponding to map blocks B10-B18, and may create a single map from map blocks B10-B18 and display the map to the user. The target acquiring unit 110 acquires the data sizes for each of the plurality of second encrypted responses.

The second time Step S120 is performed, the candidate sending unit 130 sends encrypted request candidates to the server 20 in the same manner as the first time. In Step S130, the candidate acquiring unit 120 may acquire the data sizes of each of the plurality of encrypted response candidates from the server 20 in the same manner as the first time Step S130 was performed. Alternatively, the identifying device 30 may omit the processing in Steps S120 and S130 in the second iteration.

Figure 5:
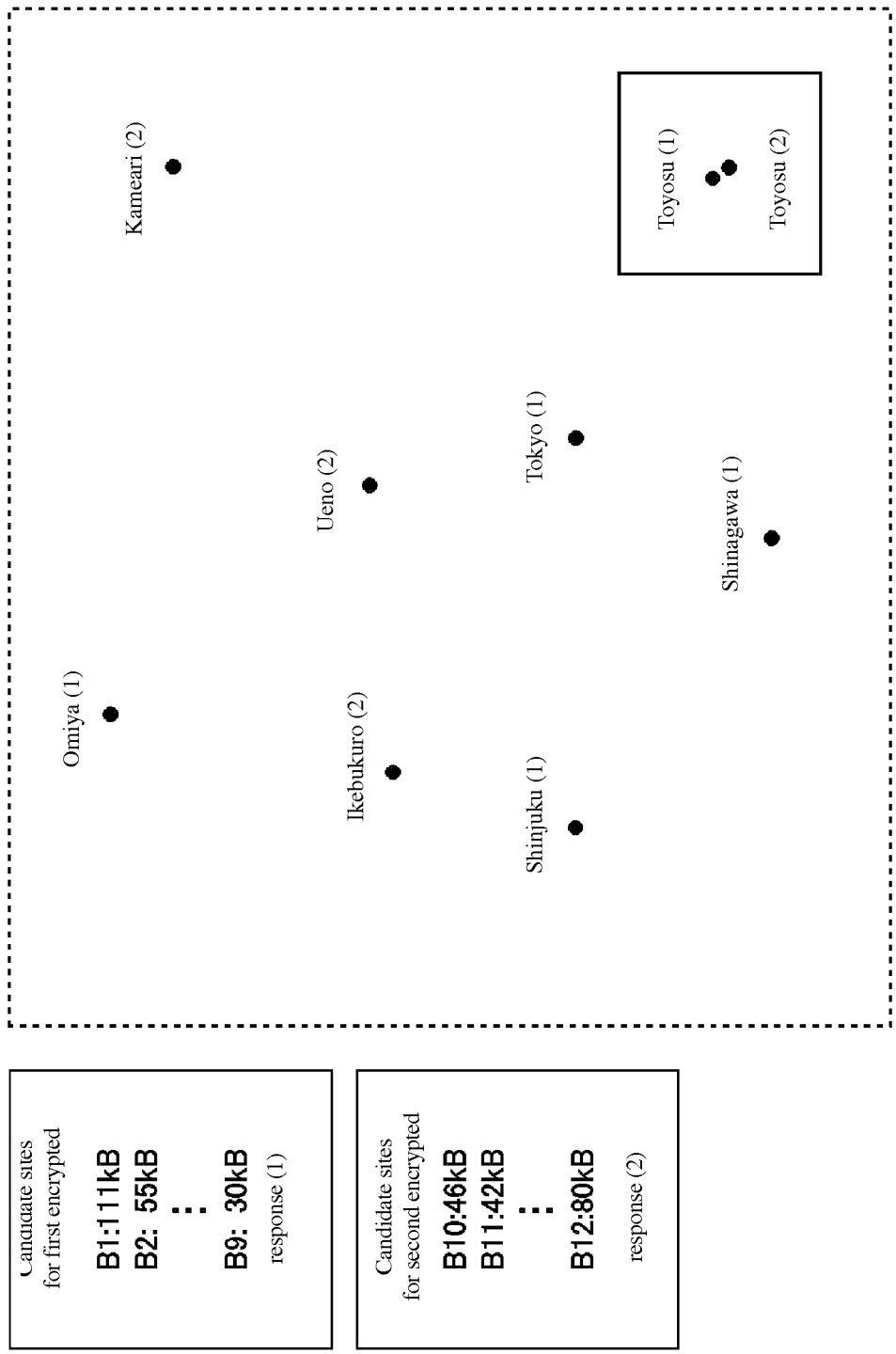
FIG. 5 shows an example of the processing performed by the identifying unit to identify a first and a second encrypted response.

FIG. 5 shows an example of the processing performed by the identifying unit 160 to identify a first and a second encrypted response. The second time Step S140 is performed, the identifying unit 160, as in the first iteration, narrows, as the second location information candidate related to the second encrypted request, the locations related to the plurality of encrypted request candidates to candidate locations related to encrypted request candidates that can be acquired from the server 20 as sets of encrypted responses matching the data size of a plurality of second encrypted response sets.

When, for example, the target acquiring unit 110 has received a plurality of second encrypted responses with data sizes 46 kB (B10), 42 kB (B11), and 80 kB (B12) as shown in FIG. 5, the identifying unit 160 narrows, as candidate locations in the second location information related to the second encrypted request, the plurality of location information candidates to locations around Ikebukuro, Ueno, Kameari, and Toyosu acquired, respectively, in encrypted response candidates with a data size of 46 kB, 42 kB, and 80 kB.

In Step S150, the identifying unit 160 identifies all of the processing request content sent by the client 10 to the server 20 on the basis of the results of identifying the request content of each of the plurality of encrypted requests. For example, the identifying unit 160 selects the first location information and the second location information on the basis of the relevance or commonalities between first location information candidate in which the first encrypted response has been identified and the second location information candidate in which the second encrypted response has been identified.

For example, the identifying unit 160 identifies the first location information and the second location information by selecting first location information and second location information within a predetermined range of reasonable traveling distances among the first location candidates for the first encrypted request and the second location information candidates for the second encrypted request.

The identifying unit 160 may use, as the range of reasonable traveling distances, a distance obtained by multiplying a predetermined maximum speed at which the client 10 can travel (for example, a maximum speed of 100 km/h for a passenger vehicle) by the time period between the first encrypted and the second encrypted request.

For example, in response to a location near Toyosu included in a first location information candidate and a location near Toyosu included in a second location information candidate being within a predetermined reasonable traveling distance, the identifying unit 160 identifies Toyosu as being the location related to the first location information and Toyosu as being the location related to the second location information. The Toyosu related to the first location information and the Toyosu related to the second location information are at adjacent but different spots, and in different map blocks (B1-B9, B10-B18).

Therefore, when a client 10 requests map data from the server 20 at the current location while traveling, the identifying device 30 can more accurately identify the location information related to an encrypted response (that is, the current location of the client 10).

Figure 6:
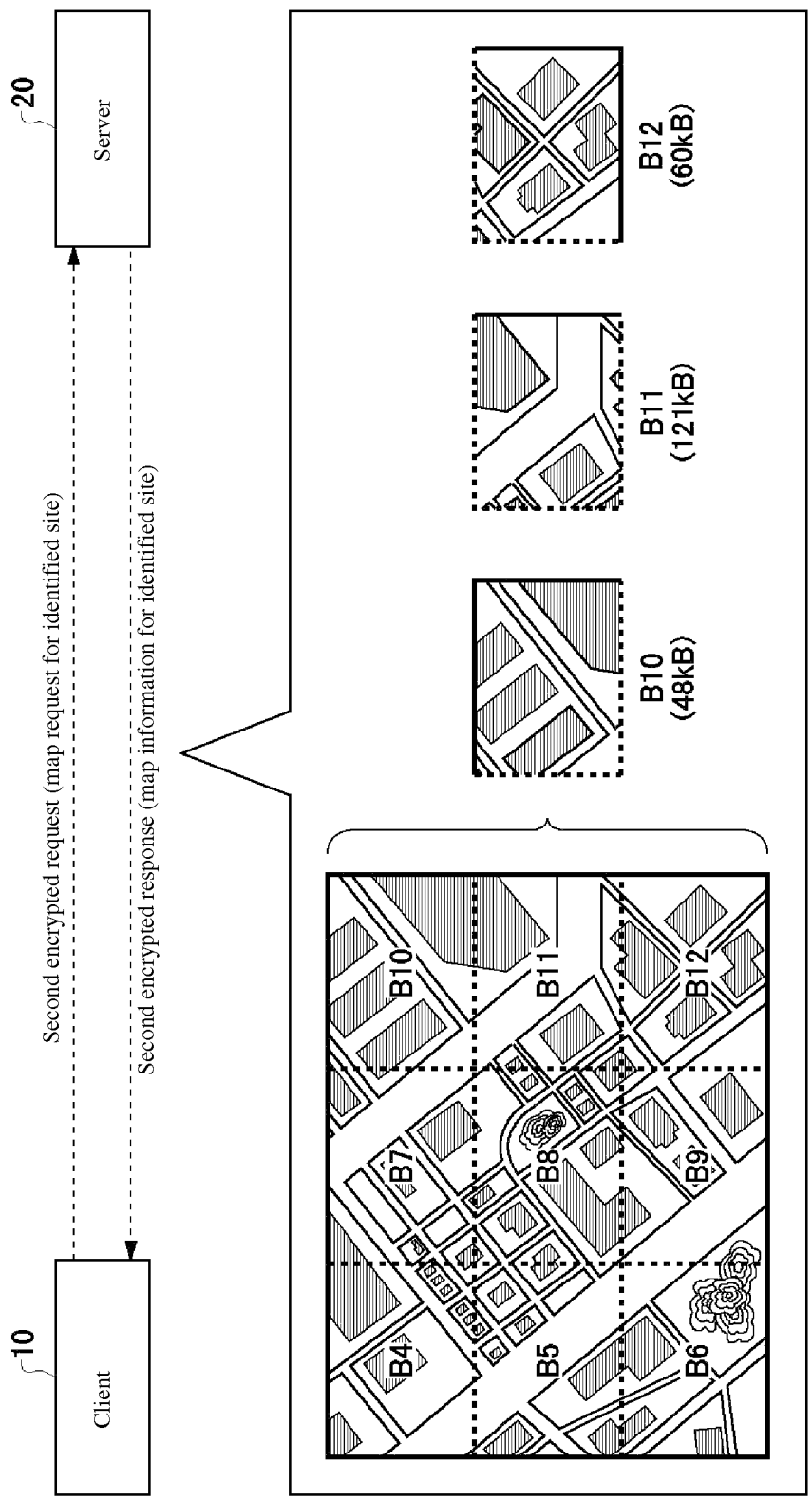
FIG. 6 shows another example of a second encrypted request and a second encrypted response.

FIG. 6 shows another example of a second encrypted request and a second encrypted response. In Step S110, the client 10 requests from the server 20, as a second encrypted request, map data corresponding to a plurality of contiguous map blocks B4-B12 adjacent to map blocks B1-B9.

Here, because map data for map blocks B4-B9 among map blocks B4-B12 have already been sent to the client 10 in the first encrypted response, the server 20 may send to the client 10 only three second encrypted responses each including map data related to unsent blocks B10-B12 as shown in the drawing.

The client 10 may receive and decrypt the second encrypted responses corresponding to map blocks B10-B12, generate a single map from map blocks B4-B12 including the map blocks B4-B9 that have already been received, and display the map for the user. The target acquiring unit 110 acquires the data size of each of the second encrypted responses related to map blocks B10-B12 in the second iteration of Step S110.

Figure 7:
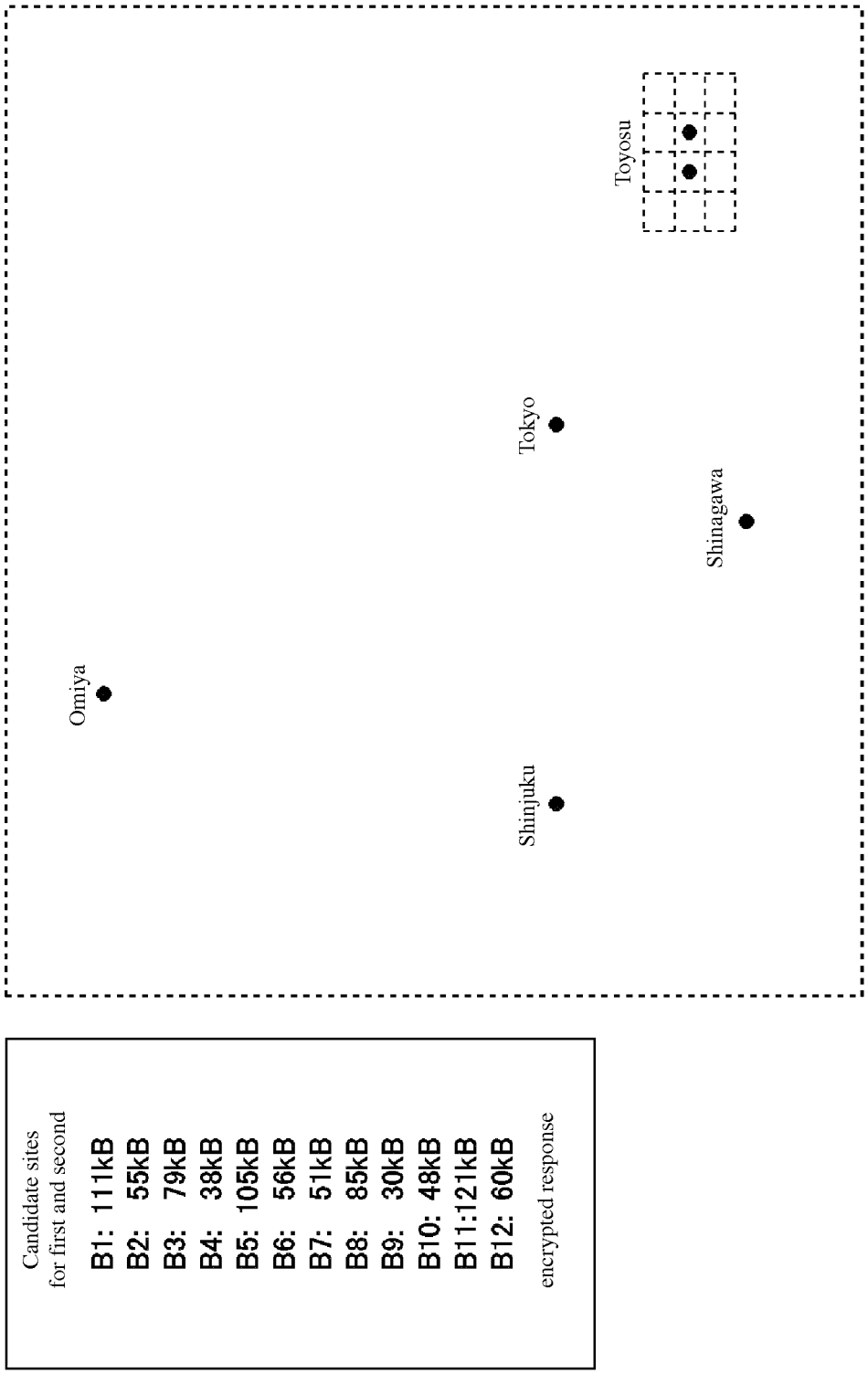
FIG. 7 shows an example of the processing performed by the identifying unit to identify the second encrypted request in FIG. 6.

FIG. 7 shows an example of the processing performed by the identifying unit 160 to identify the second encrypted request in FIG. 6. When Step S140 is performed a second time, the first position information and second position information included in the first encrypted request and the second encrypted request to be identified are identified among the known location information candidates on the basis of the results of a comparison of sets of data sizes for first encrypted responses and second encrypted responses to the sets of data sizes of each of the plurality of encrypted response candidates returned for known location information candidates.

For example, when the target acquiring unit 110 acquires, in the second and subsequent iterations of Step S110, a number of encrypted responses (three) that is less than the number of encrypted responses (nine) acquired during the first iteration of Step S110, the identifying unit 160 determines that the location related to the second encrypted request is adjacent to the location related to the first encrypted request, and identifies the first location information and the second location information adjacent to the first location information on the basis of a set of data sizes among the first encrypted response matching a set of data sizes in the second encrypted response.

For example, when the target acquiring unit 110 receives three second encrypted responses during the second iteration of Step S110, as shown in FIG. 6, the identifying unit 160 identifies, as the second location information, a location information candidate which is adjacent to the location related to a first location information candidate and which is related to a set of data sizes matching or substantially matching some of the 12 data sizes combining the second encrypted response with a portion of the first encrypted response.

For example, as shown in FIG. 7, the identifying unit 160 identifies, as the second location information, the location information candidate near any of the first location information selected by the data size of map blocks B1-B9 (Omiya, Shinjuku, Shinagawa and Toyosu) and matching or substantially matching the set of data sizes for map blocks B4-B12. As a result, the identifying unit 160 identifies, as the first location information and the second location information, two locations near Toyosu.

As in the explanation with reference to FIG. 3 through FIG. 7, the identifying unit 160 identifies the first location information and the second location information premised on the locations being in the vicinity of each other in the first location information related to the first encrypted request and the second location information related to the second encrypted request.

For example, when successively identifying location information (first location information, second location information, ..., $n^{th}$ location information), and a relatively small number (for example, 1) of the identified location information (for example, the $i^{th}$ location information, where i is an integer satisfying the equation 1<i<n) or candidates to this location information differ from the other location information (the first through $n^{th}$ location information excluding the $i^{th}$ location information), the identifying unit 160 may delete as noise the $i^{th}$ encrypted response related to the small number of location information ($i^{th}$ location information) from the identification process for the other location information. This can keep the identifying process performed by the identifying unit 160 on the other location information from being impeded by a small number of location information not matching anything else as noise.

Also, when predetermined conditions are satisfied, the identifying unit 160 may determine that the first location information and the second location information are far apart.

For example, when the identifying unit 160 has determined that a predetermined number m (where m is an integer equal to or greater than 1) of location information candidates subsequent to the $n^{th}$ location information candidate ($n+1^{th}$ location information candidate, $n+2^{th}$ location information candidate, ..., $n+m^{th}$ location information candidate) is not included among the locations anywhere near the $n^{th}$ location information candidate, the identifying unit 160 determines that the $n+1^{th}$ location information candidate, $n+2^{th}$ location information candidate, ..., and $n+m^{th}$ location information candidate are far away from the $n^{th}$ location information candidate, and that the condition of being close to the $n^{th}$ location information candidate has not been satisfied in the identification of the $n+1^{th}$ location information candidate, $n+2^{th}$ location information candidate, ..., and $n+m^{th}$ location information candidate.

In this way, the identifying device 30 can identify location information related to map data requested from the server 20 by a client 10 by acquiring the data size of encrypted responses including map data that have been returned by the server 20 to the client 10.

Figure 8:
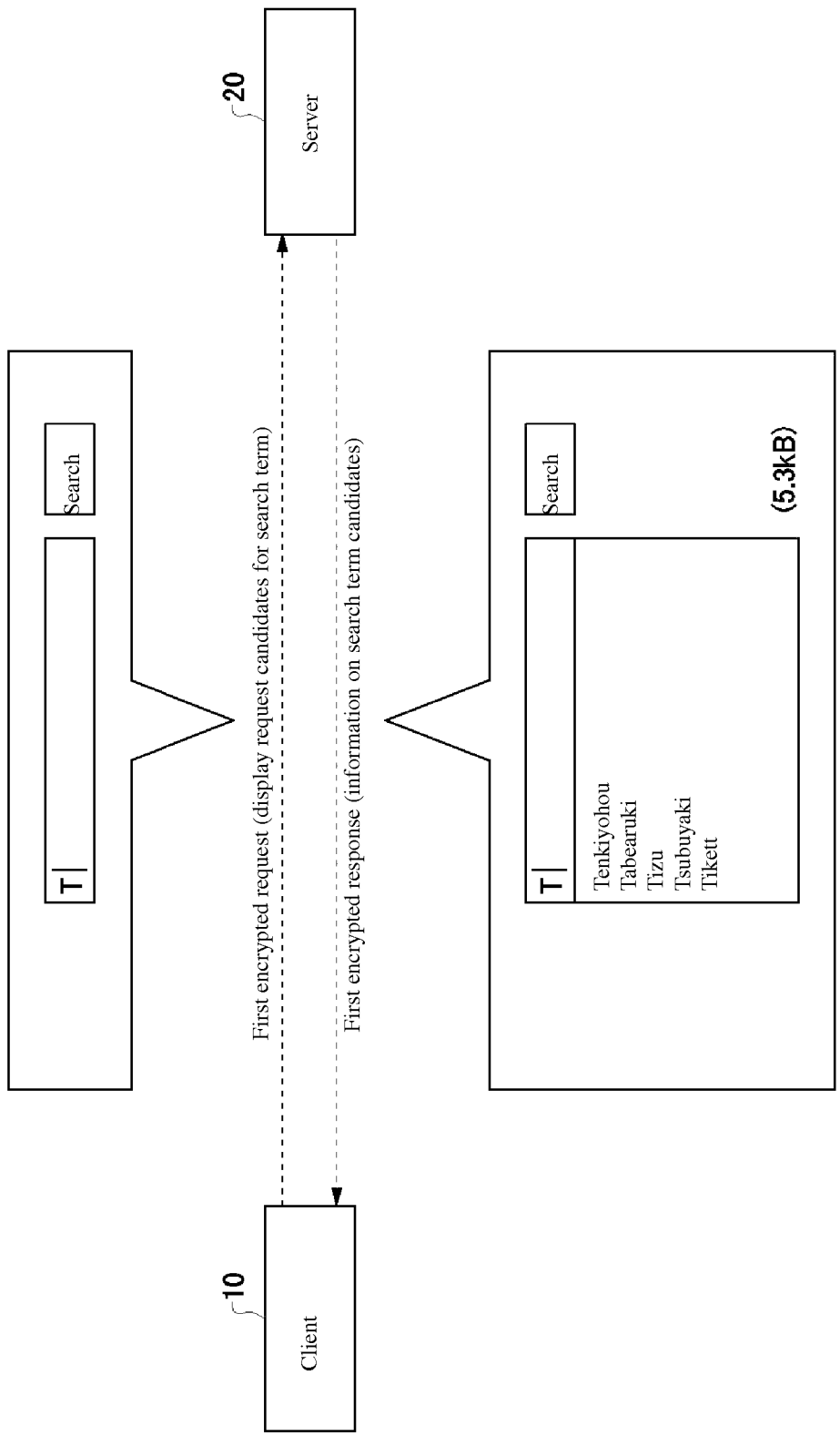
FIG. 8 shows an example of a first encrypted request and a first encrypted response when the server is a search server.

FIG. 8 through FIG. 13 shows an example of processing performed by the identifying system 1 when the server 20 is a search server. FIG. 8 shows an example of a first encrypted request and a first encrypted response. In this example, the client 10, in search request processing for the server 20, sends an encrypted request including a partially inputted character string to the server 20 each time a portion of the character string for a search term has been inputted and before sending a search request for the search term itself. The server 20 returns to the client 10 an encrypted response including character string candidates containing the partial character string, which are search term candidates with a high probability of being subsequently inputted by the client 10.

The first time the processing in Step S110 is performed (n=1), the client 10 sends to the search server 20 a first encrypted request to be identified containing a first character string after the user has inputted a first character string of a predetermined number of characters in the search term.

For example, as shown in FIG. 8, the user inputs a first character string "T", and the client 10 sends a first encrypted request to request search term candidates partially including the first character string "T".

The server 20 receives and decrypts the first encrypted request from the client 10, extracts the first character string included in the first encrypted request, and extracts from a database one or more search term candidates with a high probability of being subsequently inputted by the client 10 as search term candidates including the first character string.

For example, the server 20 may extract a predetermined number of candidates with a high frequency of being inputted by the client 10 and/or other clients as search term candidates including the first character string.

The server may extract, as search term candidates, search terms only including first character string and/or partially including the first character string, and may be character strings converted between character types such as alphanumeric characters, hiragana, katakana and kanji. For example, the server 20 may include among the search term candidates "Tenkiyohou" [weather report] when the first character string is "tenki" [in hiragana] or "Tenki" [in alphabetical characters].

When the first character string is in alphabetical characters, the first character string may include, among the search term candidates, terms in which the first character string has been partially inputted in alphabetical characters. For example, as shown in FIG. 8, when the first character string "T" for a search term has been received from the client 10, the server 20 may respond by including, as search term candidates, search term candidates "Tenkiyohou", "Tabearuki", "Tizu", "Tsubuyaki" and "Tikett" including the first character string "T" in either hiragana or alphabetical characters. The server 20 encrypts one or more search term candidates, and returns them to the client 10 as a first encrypted response.

The client 10 receives and decrypts the first encrypted response, extracts the search term candidates, and displays the search term candidates for the user along with the first character string. The target acquiring unit 110 acquires the first encrypted response and its data size.

When Step S120 is performed for the first time, the candidate sending unit 130 generates, in response to a plurality of search term candidates, a plurality of first encrypted request candidates corresponding to known first character string candidates serving as request content candidates from the client 10 to the server 20.

For example, the candidate sending unit 130 generates a plurality of known first character string candidates whose length includes a predetermined number of characters from alphabetical characters, hiragana, katakana, numbers and/or kanji, and generates first encrypted request candidates corresponding to the first character string candidates.

Figure 9:
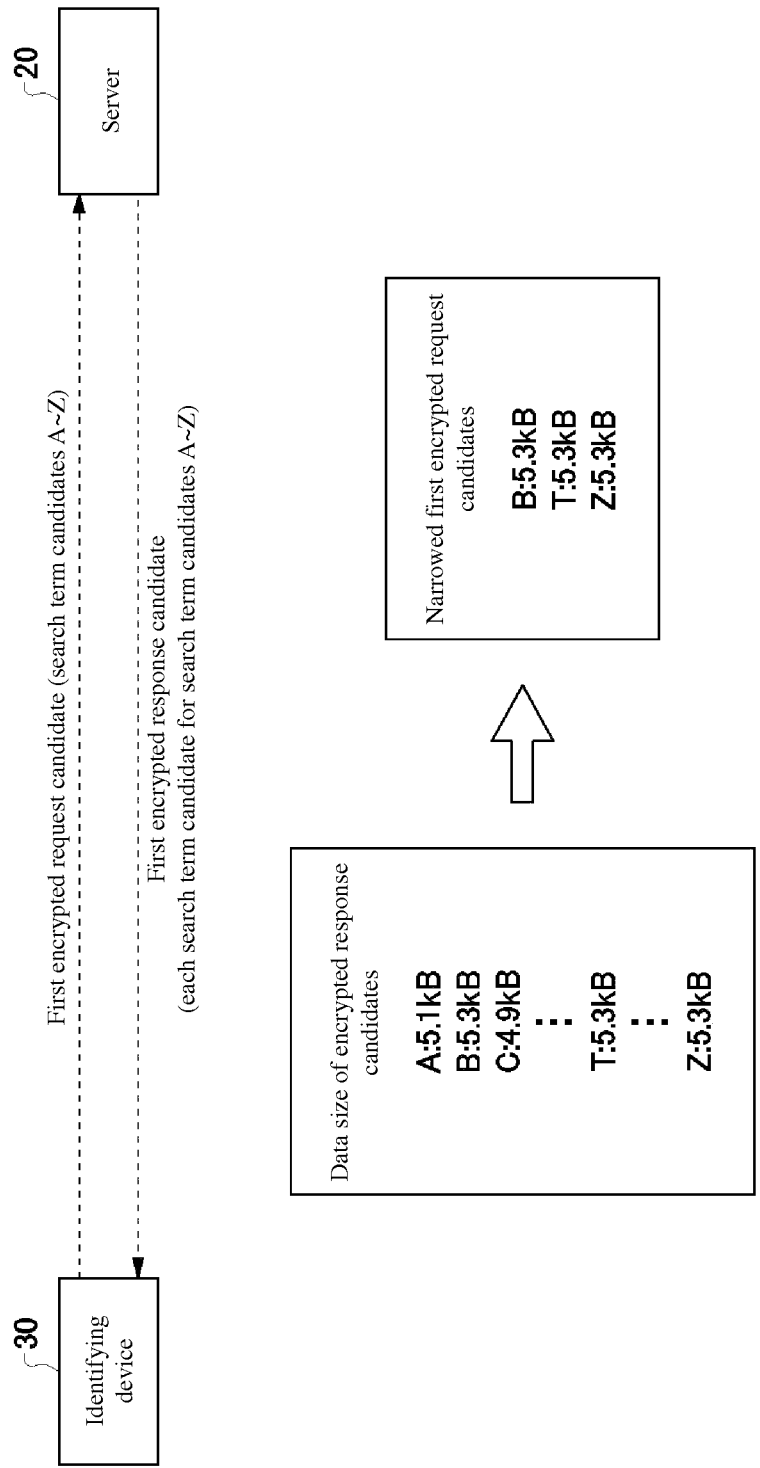
FIG. 9 shows an example of first encrypted request candidates and first encrypted response candidates.

In the example shown in FIG. 9, the candidate sending unit 130 generates 26 first encrypted request candidates including, as first character string candidates, a single alphabetical character among the 26 characters A-Z. In another example, the candidate sending unit 130 may generate first character string candidates with two or more characters.

In yet another example, the candidate sending unit 130 stores beforehand, in an internal or external storage device of the identifying device, frequently appearing terms, and retrieves from the storage device, as first character string candidates, predetermined character strings with one or more characters constituting the initial portion of frequently appearing terms.

Next, the candidate sending unit 130 may send to the server 20 a plurality of first encrypted request candidates corresponding to a plurality of known first character string candidates of a length equal to a predetermined number of characters. The server 20 decodes each of the first encrypted request candidates and extracts the first character string candidates included in the request content. The server 20 may extract search term candidates including the first character string candidates based on the first character string candidates in the same manner as the processing performed in Step S110, and may send to the identifying device 30 first encrypted response candidates including these search term candidates.

When Step S130 is performed for the first time, the candidate acquiring unit 120 acquires the data sizes of each of the first encrypted response candidates returned by the server 20. For example, as shown in FIG. 9, the candidate receiving unit 140 of the candidate acquiring unit 120 may acquire the first encrypted response candidates from the server 20 corresponding to each alphabetical character and the data sizes of these candidates (for example, 5.1 kB for first character string candidate "A", 5.3 kB for "B", 4.9 kB for "C", . . . , and 5.3 kB for "Z").

The candidate receiving unit 140 may acquire first encrypted response candidates for all of the first encrypted request candidates, or may acquire first encrypted response candidates for only some of the first encrypted request candidates. When the server 20 cannot acquire search term candidates including first character string candidates for some of the first character string candidates (when the first character string candidate is a meaningless string that does not form a word or abbreviation), the candidate receiving unit 140 does not receive a first encrypted response candidate.

When Step S140 is performed for the first time, the identifying unit 160 extracts first character string candidates to be identified from the first character string candidates on the basis of a comparison of the data size of a first encrypted response to the data sizes of a plurality of first encrypted response candidates.

For example, when the target acquiring unit 110 has received a first encrypted response with a data size of 5.3 kB in Step S110 as shown in FIG. 4, the identifying unit 160 narrows the first character string candidates (A-Z) sent by the candidate sending unit 130 in Step S120, as shown in FIG. 9, to first character string candidates "B", "T" and "Z" matching the data size (5.3 kB) of the first encrypted response. When the identifying unit 160 has narrowed the first character string candidate to 1, the one candidate is identified as the first character string in Step S150.

When Step S110 is performed for a second time, the client 10 responds to the user inputting at least a portion of a character string for a search term following the first character string by sending to the server 20, as a second encrypted request to be identified, request content including a second character string following and connected to the first character string.

Figure 10:
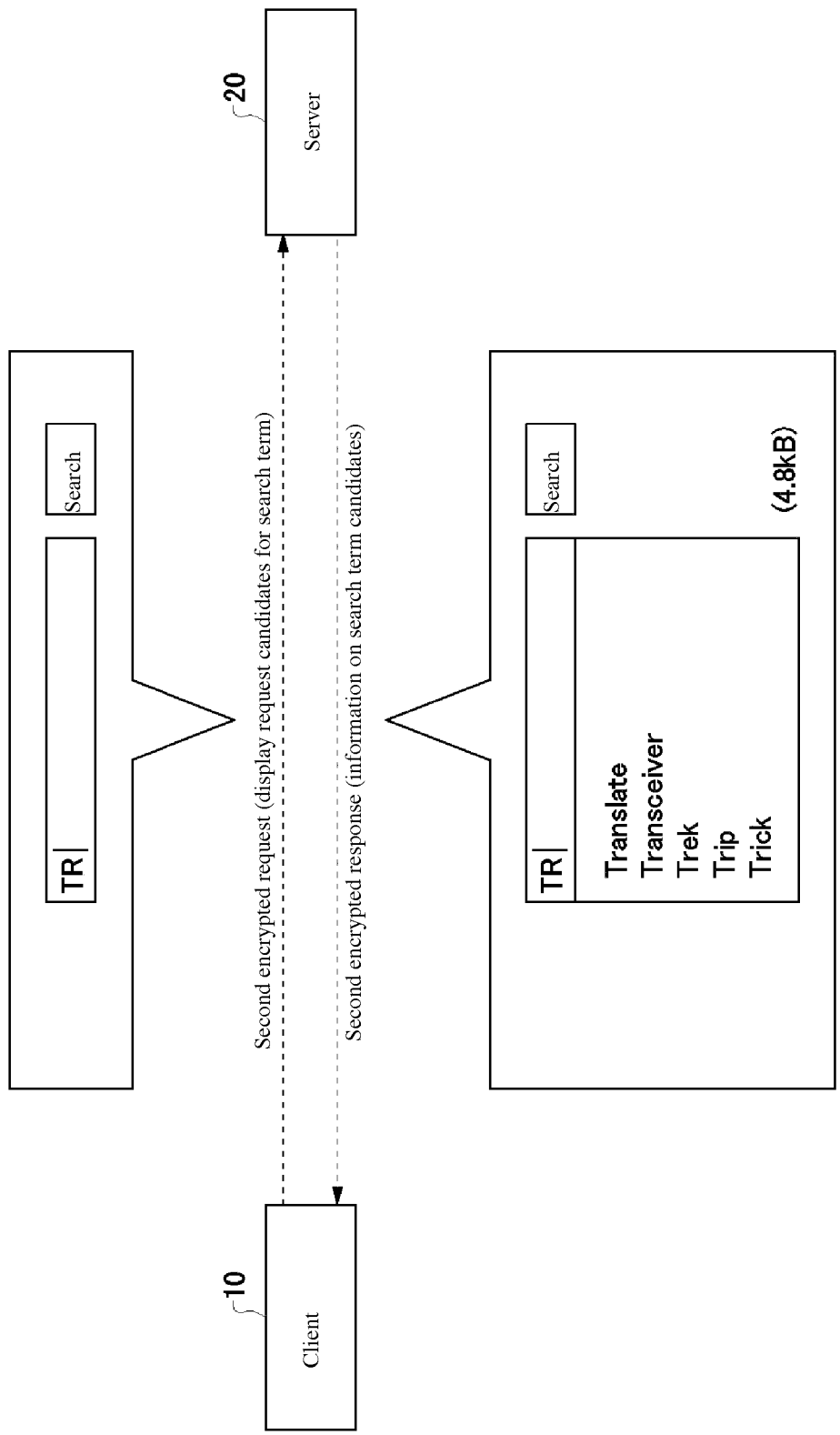
FIG. 10 shows an example of a second encrypted request and a second encrypted response.

For example, as shown in FIG. 10, the user enters "R" after the first character string "T", and the client 10 sends to the server 20 a second encrypted request for search term candidates including, as a part, the second character string "TR" in which "R" follows "T".

The server 20 decrypts the second encrypted request for search terms including the second character string from the client 10, extracts the second character string, and extracts from a database, as search terms including the second character string, one or more search term candidates with a high probability of being inputted subsequently by the client 10.

The server 20 may extract search term candidates including the second character string in the same manner in which search term candidates including the first character string were extracted. For example, the server 20 extracts search term candidates "Translate", "Transceiver", "Trek", "Trip" and "Trick" including the second character string "TR", and generates a second encrypted response including the extracted search terms. The server 20 encrypts one or more search term candidates, and returns them to the client 10 as a second encrypted response.

The client 10 receives and decrypts the second encrypted response, extracts the search term candidates, and may display the search term candidates along with the second character string for the user as shown in the drawing. The target acquiring unit 110 acquires the second encrypted response, and acquires its data size.

When Step S120 is performed a second time, the candidate sending unit 130 generates a plurality of second encrypted request candidates corresponding to a plurality of second character string candidates in which known character strings have been added after the first character string.

For example, the candidate sending unit 130 adds characters of a length equivalent to a predetermined number of characters from alphabetical characters, hiragana, katakana, numbers and/or kanji to a first character string or first character string candidate to generate a plurality of second character string candidates, and generates second encrypted requests corresponding to the plurality of second character string candidates.

Figure 11:
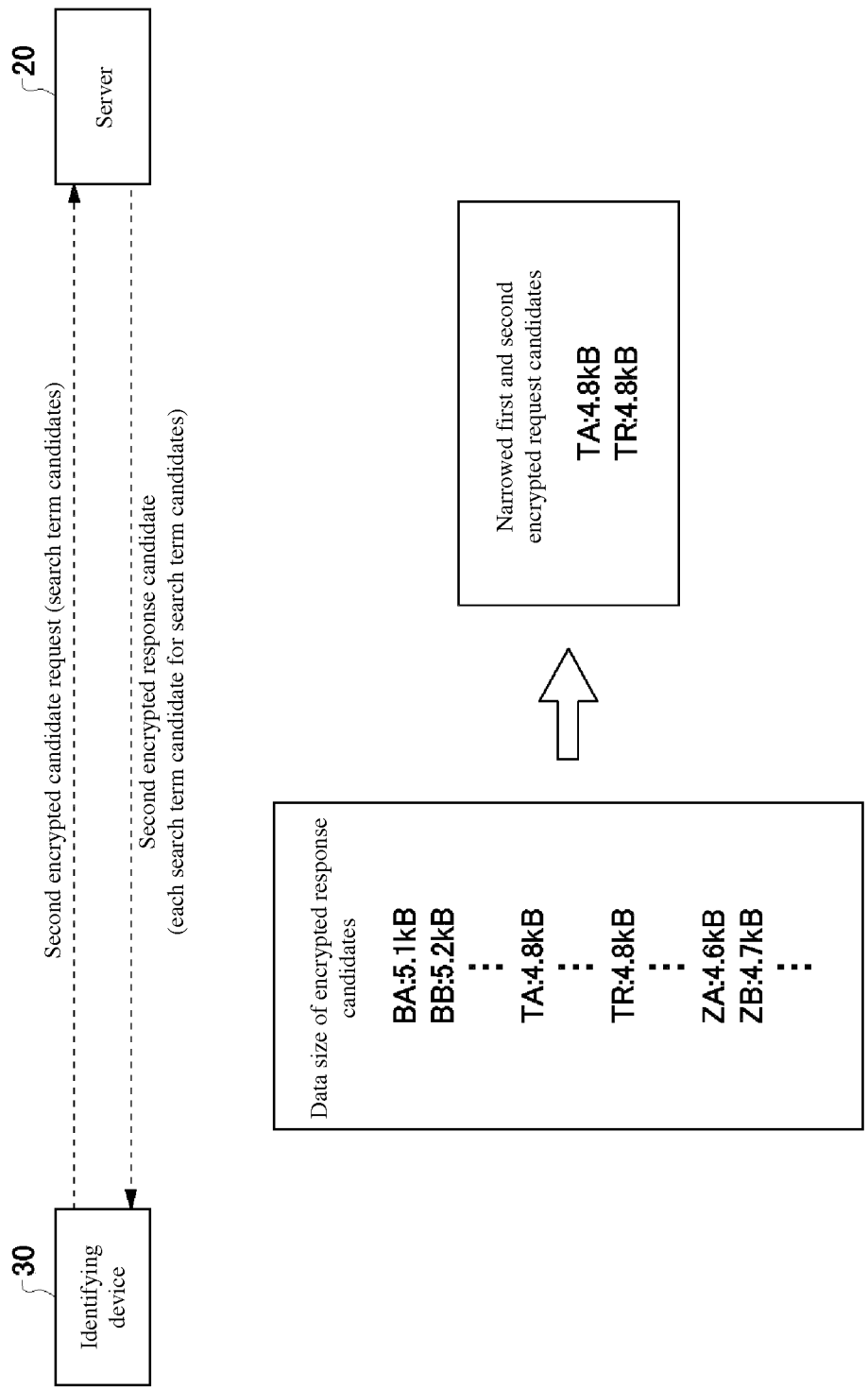
FIG. 11 shows an example of second encrypted request candidates and second encrypted response candidates.

In the example shown in FIG. 11, the candidate sending unit 130 adds one of 26 alphabetical characters (A-Z) to each first character string candidate ("B", "T" and "Z") to generate 26×3=78 second character string candidates ("BA" through "BZ", "TA" through "TZ", and "ZA" through "ZZ"), and 78 second encrypted request candidates are generated for the second character string candidates. In another example, the candidate sending unit 130 may generate second character string candidates with two or more characters added to the first character string or first character string candidates.

In yet another example, the candidate sending unit 130 stores beforehand, in an internal or external storage device of the identifying device 30, frequently appearing terms, detects in the storage device frequently appearing terms including a first character string or first character string candidate and beginning with a first character string or first character string candidate, adds character strings with a predetermined number (one or more) characters to the first character string in frequently appearing words, and uses these as second character string candidates.

In addition to, or instead of, adding characters such as alphanumeric characters to a first character string or first character string candidate, the candidate sending unit 130 may convert the first character string or first character string candidate to kanji and/or delete a predetermined number of characters from the end of a first character string or first character string candidate to generate a plurality of second character string candidates.

Next, the candidate sending unit 130 may send to the server 20 a plurality of second encrypted request candidates corresponding to a plurality of second character string candidates. The server 20 decrypts each of the second encrypted request candidates, and extracts second character string candidates included in the request content. The server 20 may extract search term candidates for second character string candidates in the same manner as in Step S110, and send the second encrypted response candidates including search term candidates to the identifying device 30.

When Step S130 is performed a second time, the candidate acquiring unit 120 acquires the data size of each second encrypted response candidate returned by the server 20. For example, as shown in FIG. 11, the candidate receiving unit 140 may acquire the second encrypted response candidates and their data sizes from the server 20 (for example, 5.1 kB for second character string candidate "BA", 5.2 kB for "BB", . . . , 4.8 kB for "TA", 4.8 kB for "TR", . . . , 4.6 kB for "ZA", 4.7 kB for "ZB", etc.).

When Step S140 is performed for a second time, the identifying unit 160 extracts inputted second character string candidates for search terms among the second character strings on the basis of a comparison of the data size of a second encrypted response to the data sizes of a plurality of second encrypted response candidates.

For example, in Step S110, when the target acquiring unit 110 has received a second encrypted response with a data size of 4.8 kB as shown in FIG. 10, the identifying unit 160, in Step S120 of the drawing, narrows the second character string candidates sent by the candidate sending unit 130 ("BA" through "BZ", "TA" through "TZ", and "ZA" through "ZZ") to "TA" and "TR" as second character string candidates that match the data size (4.8 kB) of the second encrypted response. When the second character string candidates have been narrowed to one, the identifying unit 160 may identify the one candidate as the second character string in Step S150.

When Step S110 is performed for a third time, the client 10, in response to the user inputting at least a portion of a character string for a search term following the second character string, sends to the server 20, as a third encrypted request to be identified, request content including a third character string with a character string following and connected to the second character string.

Figure 12:
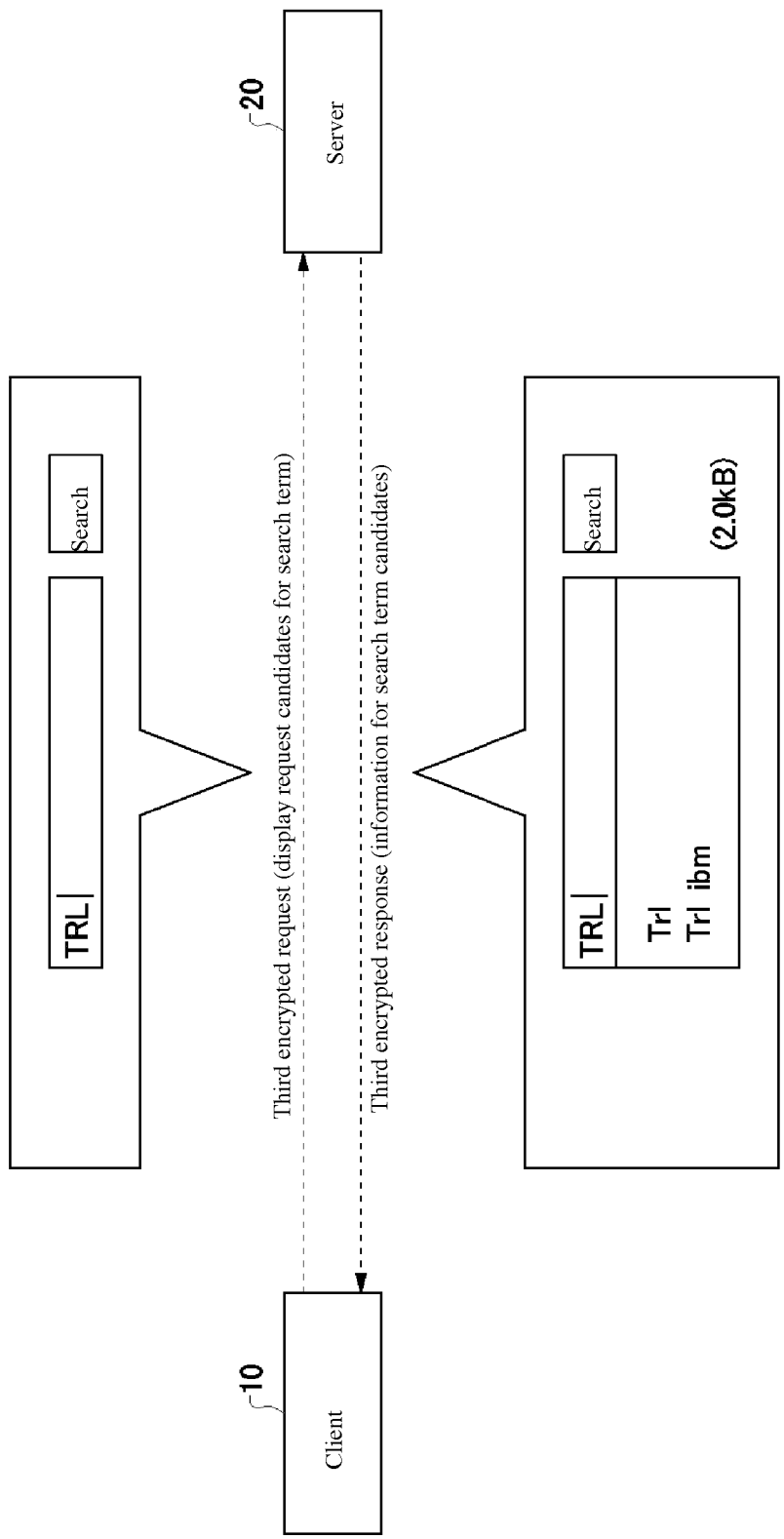
FIG. 12 shows an example of a third encrypted request and a third encrypted response.

For example, as shown in FIG. 12, the user enters "L" after the second character string "TR", and the client 10 sends to the server 20 a third encrypted request for search term candidates including, as a part, the third character string "TRL".

The server 20 receives the third encrypted request including the third character string among the search terms from the client 10, decrypts the third encrypted request for search terms, extracts the third character string, and extracts from a database, as search terms including the third character string, one or more search term candidates with a high probability of being inputted subsequently by the client 10.

The server 20 may extract search term candidates including the third character string in the same manner in which search term candidates including the first character string were extracted. For example, the server 20 extracts search term candidates "Trl" and "Trl ibm" including the third character string "TRL", and generates a third encrypted response including the extracted search terms. The server 20 encrypts one or more search term candidates, and returns them to the client 10 as a third encrypted response.

The client 10 receives and decrypts the third encrypted response, extracts the search term candidates, and may display the search term candidates along with the third character string for the user. The target acquiring unit 110 acquires the third encrypted response, and acquires its data size.

When Step S120 is performed a third time, the candidate sending unit 130 generates a plurality of third encrypted request candidates corresponding to a plurality of third character string candidates in which known character strings have been added after the second character string.

For example, the candidate sending unit 130 adds characters of a length equivalent to a predetermined number of characters from alphabetical characters, hiragana, katakana, numbers and/or kanji to a second character string or second character string candidate to generate a plurality of third character string candidates, and generates third encrypted requests corresponding to the plurality of third character string candidates. The candidate sending unit 130 may generate third encrypted request candidates by employing the same method used to generate second encrypted response candidates.

Figure 13:
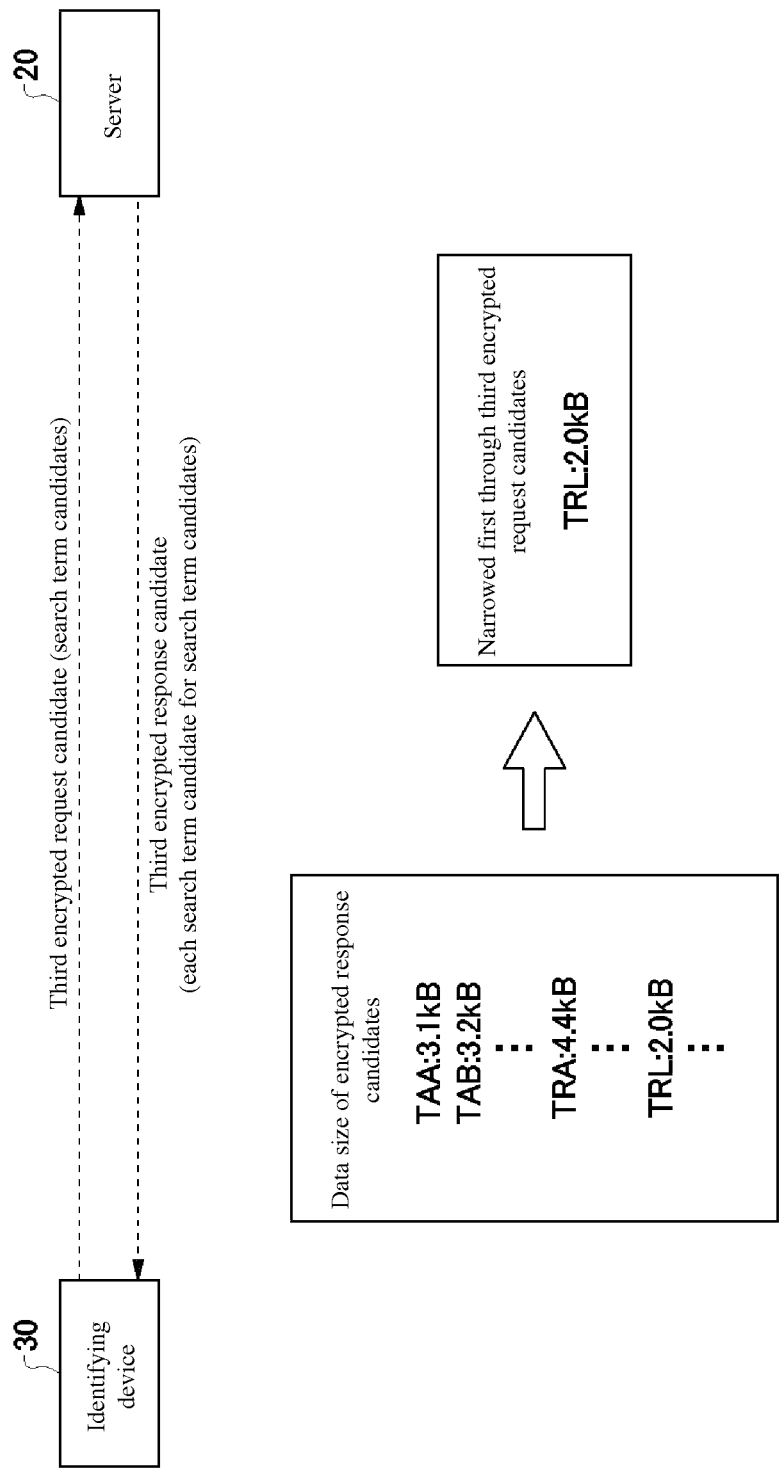
FIG. 13 shows an example of third encrypted request candidates and third encrypted response candidates.

In the example shown in FIG. 13, the candidate sending unit 130 adds one of 26 alphabetical characters (A-Z) to each first character string candidate ("TA" and "TR") to generate 26×2=52 third character string candidates ("TAA" through "TAZ" and "TRA" through "TRZ"), and 52 third encrypted request candidates are generated for the third character string candidates.

Next, the candidate sending unit 130 may send to the server 20 a plurality of third encrypted request candidates corresponding to a plurality of third character string candidates. The server 20 processes the third encrypted request candidates in the same way as the second encrypted request candidates, extracts search term candidates with the third character string candidates, and sends third encrypted response candidates including the search term candidates to the identifying device 30.

When Step S130 is performed a third time, the candidate acquiring unit 120 acquires the data size of each third encrypted response candidate returned by the server 20. For example, as shown in the drawing, the candidate receiving unit 140 may acquire the third encrypted response candidates and their data sizes from the server 20 (for example, 3.1 kB for third character string candidate "TAA", 3.2 kB for "TAB", . . . , 4.4 kB for "TRA", 2.0 kB for "TRL", etc.).

When Step S140 is performed for a third time, the identifying unit 160 extracts inputted third character string candidates for search terms among the third character strings on the basis of a comparison of the data size of a third encrypted response to the data sizes of a plurality of third encrypted response candidates.

For example, in Step S110, when the target acquiring unit 110 has received a third encrypted response with a data size of 2.0 kB as shown in FIG. 12, the identifying unit 160, in Step S120 of the drawing, narrows the third character string candidates sent by the candidate sending unit 130 ("TAA" through "TAZ", and "TRA" through "TRZ") to "TRL" as a third character string candidate that matches the data size (2.0 kB) of the third encrypted response.

When the third character string candidates have been narrowed to one, the identifying unit 160 in Step S150 identifies the third character string for the search term included in the third encrypted request to be identified as "TRL" and, based on this result, identifies the search term related to the first through third encrypted requests sent by the client 10 to the server 20 as "TRL".

In the explanation of this example, the candidate sending unit 130 added another character string to the $i^{th}$ character string as the $i^{th}$ encrypted request to be identified when the $i^{th}$ encrypted request had not been identified immediately before the $n^{th}$ encrypted request (where i is an integer satisfying the equation 0<i<n). However, the candidate sending unit 130 may send to the server an $n^{th}$ encrypted request corresponding to each of a plurality of content candidates including the identified $i^{th}$ encrypted request when the $i^{th}$ encrypted request has been identified immediately before the $n^{th}$ encrypted request (where i is an integer satisfying the equation 0<i<n).

Therefore, the identifying device 30 can identify a search term and the character strings constituting a portion of the search term requested of the server 20 by the client 10 by acquiring the data size of an encrypted response including search term candidates returned to the client 10 by the server 20.

The identifying device 30 may execute the process based on the content of an identified character string. For example, the identifying device 30 may determine whether or not an identified character string includes a predetermined improper keyword. When an identified character string includes an improper keyword, the identifying device 30 may send a notice to the client 10, generate a character string long related to the encrypted request sent by the client 10, and/or prevent access by the client 10 to the server 20.

Figure 14:
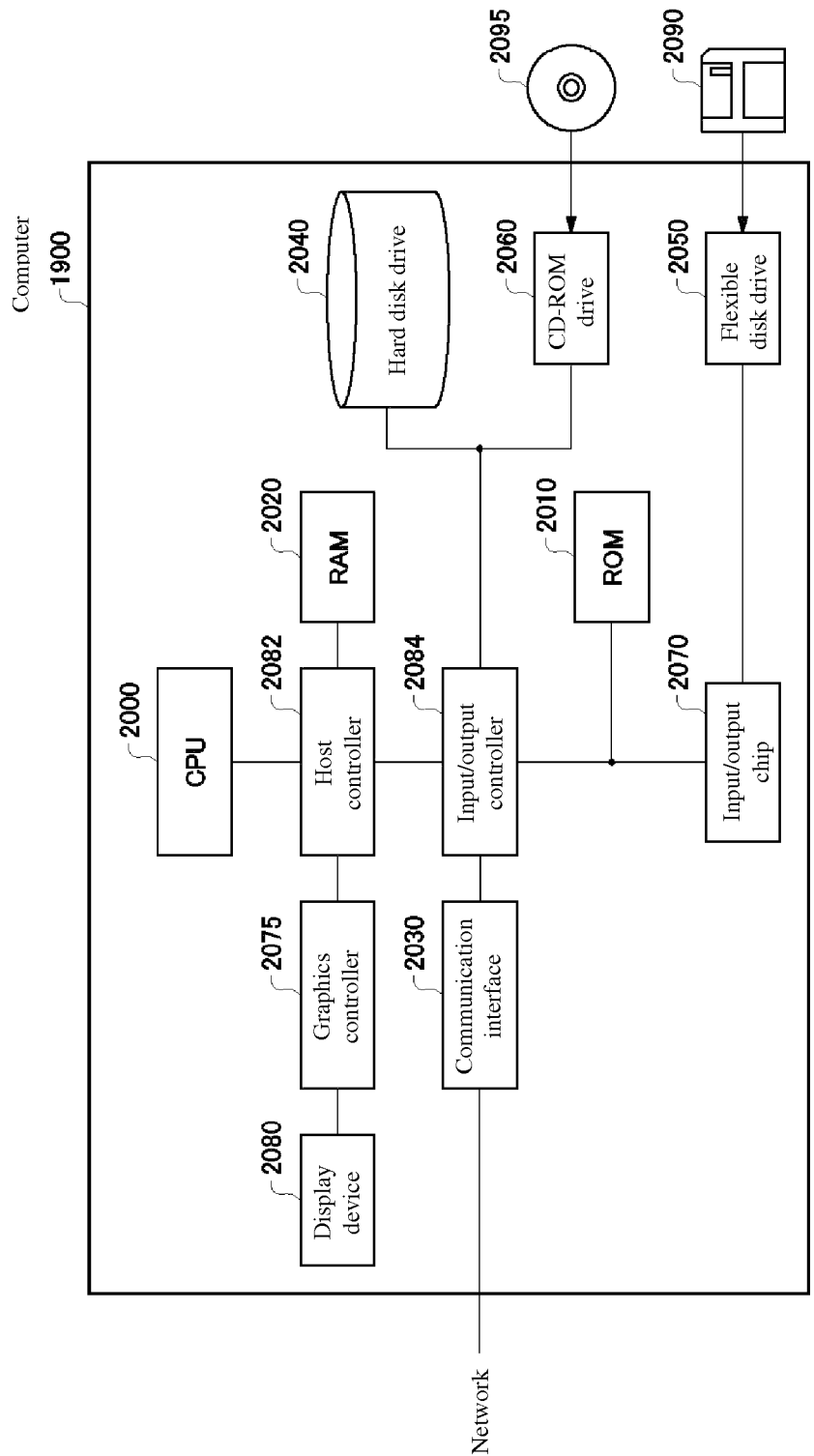
FIG. 14 shows an example of a hardware configuration for the computer.

FIG. 14 shows an example of a hardware configuration for a computer 1900 functioning as a client 10, a server 20 and/or an identifying device 30. The computer 1900 in the present embodiment is equipped with a CPU peripheral portion having a CPU 2000, RAM 2020, graphics controller 2075 and display device 2080 connected to each other by a host controller 2082, an input/output portion having a communication interface 2030, a hard disk drive 2040 and a CD-ROM drive 2060 connected to the host controller 2082 by an input/output controller 2084, and a legacy input/output portion having a ROM 2010, flexible disk drive 2050, and input/output chip 2070 connected to the input/output controller 2084.

The host controller 2082 is connected to RAM 2020, a CPU 2000 accessing the RAM 2020 at a high transfer rate, and a graphics controller 2075. The CPU 2000 is operated on the basis of a program stored in the ROM 2010 and the RAM 2020, and controls the various units.

The graphics controller 2075 acquires the image data generated in the frame buffer of the RAM 2020 by the CPU 2000 and other units, and displays this image data on the display device 2080. Alternatively, the graphics controller 2075 can include a frame buffer for storing image data generated by the CPU 2000 and other units.

The input/output controller 2084 is connected to a host controller 2082, a communication interface 2030 serving as a relatively high-speed input/output device, a hard disk drive 2040, and a CD-ROM drive 2060. The communication interface 2030 communicates with the other devices via a wired or wireless network.

The communication interface also functions as hardware for communicating with the outside. The hard disk drive 2040 stores the programs and data used by the CPU 2000 in the computer 1900. The CD-ROM drive 2060 reads programs and data from the CD-ROM 2095 and provides them to the hard disk drive 2040 via the RAM 2020.

The input/output controller 2084 is connected to the ROM 2010, the flexible disk drive 2050, and the relatively low-speed input/output device of the input/output chip 2070. The ROM 2010 stores the boot program executed by the computer 1900 at startup and/or programs relying on hardware in the computer 1900.

The flexible disk drive 2050 reads programs or data from a flexible disk 2090, and provides the programs and data to the hard disk drive 2040 via the RAM 2020. The input/output chip 2070 connects the flexible disk drive 2050 to the input/output controller 2084, and various types of input/output devices are connected to the input/output controller 2084 via a parallel port, serial port, keyboard port, or mouse port, etc.

A program provided to the hard disk drive 2040 via the RAM 2020 is stored on a recording medium such as a flexible disk 2090, CD-ROM 2095 or IC card, and provided by the user. A program is read from the recording medium, installed in the hard disk drive 2040 inside the computer 1900 via the RAM 2020, and executed by the CPU 2000.

Programs causing the computer 1900 to function as the identifying device 30 include a target acquiring module, candidate acquiring module, candidate sending module, candidate receiving module, and identifying module. These programs or modules may work with the CPU 2000 and other components to cause the computer 1900 to function as the target acquiring unit 110, candidate acquiring unit 120, candidate sending unit 130, candidate receiving unit 140, and identifying unit 160.

The information processing steps written in these programs are specific means activated by reading the programs to the computer 1900 so that the software cooperates with the various types of hardware resources described above. These specific means function as the target acquiring unit 110, candidate acquiring unit 120, candidate sending unit 130, candidate receiving unit 140, and identifying unit 160. These specific means realize operations and the processing of information in the computer 1900 of the present embodiment to construct an identifying device 30 for this intended purpose.

For example, when the computer 1900 communicates with an external device, the CPU 2000 executes the communication program loaded in the RAM 2020, and instructs the communication interface 2030 in the communication processing on the basis of the processing content described in the communication program.

The communication interface 2030 is controlled by the CPU 2000, and reads the transmitted data stored in the transmission buffer region of a memory device such as the RAM 2020, hard disk drive 2040, flexible disk 2090 or CD-ROM 2095, or writes reception data received from the network to a reception buffer region of the storage device.

In this way, the communication interface 2030 transfers transmitted and received data to a storage device such as storage unit 122 using the direct memory access (DMA) method. Alternatively, the CPU 2000 transfers transmitted and received data by reading data from the source storage device or communication interface 2030, and transfers and writes data to the destination communication interface 2030 or storage device.

Also, the CPU 2000 writes all of the data or the necessary data to the RAM 2020 via, for example, a DMA transfer, from files or databases stored in an external storage device such as a hard disk drive 2040, a CD-ROM drive 2060 (CD-ROM 2095) or a flexible disk drive 2050 (flexible disk 2090), and performs various types of processing on the data in the RAM 2020.

The CPU 2000 then writes the processed data to an external storage device via, for example, a DMA transfer. Because the RAM 2020 temporarily stores the contents of the external storage device during this process, the RAM 2020 and the external storage device are generally referred to in the present embodiment as memory, a storage unit, or a storage device.

The various types of information in the programs, data, tables and databases of the present embodiment are stored in these memory devices, and are the targets of information processing. The CPU 2000 can hold some of the RAM 2020 in cache memory, and read and write data to the cache memory. Here, the cache memory performs some of the functions of the RAM 2020. Therefore, this division is excluded in the present embodiment. Cache memory is included in the RAM 2020, the memory, and/or the storage device.

The CPU 2000 also performs various types of processing on data read from the RAM 2020 including the operations, processing, condition determination, and information retrieval and substitution described in the present embodiment and indicated by a sequence of instructions in the program, and writes the results to the RAM 2020. For example, when performing a condition determination, the CPU 2000 compares various types of variables described in the present embodiment to other variables or constants to determine whether or not conditions such as greater than, less than, equal to or greater than, equal to or less than or equal to have been satisfied. When a condition has been satisfied (or not satisfied), the process branches to a different sequence of instructions or calls up a subroutine.

The CPU 2000 can also retrieve information stored in files and databases inside the memory device. For example, when a plurality of entries associating an attribute value for a second attribute to an attribute value for a first attribute, the CPU 2000 can retrieve an entry matching the conditions indicated by the attribute value of the first attribute among the plurality of entries stored in the storage device, and then obtain the attribute value of the second value associated with the first value satisfying a predetermined condition by reading the attribute value of the second attribute stored in the entry.

A program or module described above can be stored in a recording medium of an external unit. Instead of a flexible disk 2090 or a CD-ROM 2095, the recording medium can be an optical recording medium such as a DVD or CD, a magneto-optical recording medium such as MO, a tape medium, or a semiconductor memory such as an IC card. The recording medium can also be a storage device such as a hard disk or RAM provided in a server system connected to a dedicated communication network or the internet, and the program can be provided to the computer 1900 via the network.

The present invention was explained using an embodiment, but the technical scope of the present invention is not limited to the embodiment described above. The possibility of many changes and improvements to this embodiment should be apparent to those skilled in the art. Embodiments including these changes and improvements are within the technical scope of the present invention, as should be clear from the description of the claims.

The order of execution for operations, steps and processes in the devices, systems, programs and methods described in the claims, description and drawings was described using such terms as "previous" and "prior". However, these operations, steps and processes can be realized in any order as long as the output of the previous process is used by the subsequent process. The operational flow in the claims, description and drawing were explained using terms such as "first" and "next" for the sake of convenience. However, the operational flow does not necessarily have to be executed in this order.

What is claimed is:

1. A method for identifying request content of an encrypted request message communicated over a network from a client device to a server device, the method comprising the steps of:
   receiving, at one or more computer processors, an encrypted response message communicated over said network by the server device in response to the encrypted request message received at said server device;
   determining at one or more computer processors one or more of: a data size, a response time, a location information, or a character string of the received encrypted response message;
   receiving, at the one or more computer processors, a plurality of encrypted response message candidates communicated over said network by the server corresponding to a plurality of known encrypted request message candidates received at said server device;
   determining at one or more computer processors one or more of: a data size, a response time, a location information, or a character string of each of the received plurality of encrypted response message candidates; and
   identifying, by the one or more computer processors, content of the encrypted request message by comparing the one or more of: the data size, the response time, the location information, or the character string of the encrypted response message to the respective one or more of: the data size, the response time, the location information, or the character string of each of the plurality of encrypted response message candidates.

2. The method of claim 1, further comprising:
   receiving, at the one or more computer processors a further plurality of encrypted response messages communicated over said network by the server corresponding to a further plurality of encrypted request messages received at said server device; and
   determining at the one or more computer processors one or more of: a data size, a response time, a location information, or a character string of each of the received further plurality of encrypted response messages; wherein
   said identifying content of the encrypted request message comprises:
   identifying, at the one or more computer processors, content of each of the further plurality of encrypted request messages by comparing one or more of: the data size, the response time, the location information, or the character string of each of the further plurality of encrypted response messages to the respective one or more of: the data size, the response time, the location information, or the character string of each of the plurality of encrypted response message candidates.

3. The method of claim 2: wherein the determining at one or more computer processors of one or more of a data size, a response time, a location information, or a character string of each of the received further plurality of encrypted response messages comprises:
   determining a first information about a first encrypted response message communicated over said network by the server device corresponding to a first encrypted request message received at said server device and a second information about a second encrypted response message communicated over said network by the server device corresponding to a second encrypted request message received at said server device, the first information and second information comprising one or more of: a data size, a response time, a location information, or a character string;
   wherein the identifying the content of each of the further plurality of encrypted request messages comprises:
   identifying, at the one or more computer processors, a first content of the first encrypted response message corresponding to the first encrypted request message by comparing the first information about the first encrypted response message to the one or more of: a data size, a response time, a location information, or a character string of each of the plurality of encrypted response message candidates and identifying at the one or more computer processors a second content of the second encrypted response message corresponding to the second encrypted request message by comparing the second information about the second encrypted response message to the one or more of: a data size, a response time, a location information, or a character string of each of the plurality of encrypted response message candidates; and further comprising the step of identifying, by one or more computer processors, content that is included in both of the first content and the second content.

4. A non-transitory computer program product for identifying request content of an encrypted request message communicated over a network from a client device to a server device, the computer program product comprising:

one or more storage devices; and program instructions stored on the one or more storage devices, the program instructions comprising:

program instructions to receive, from a server, an encrypted response message communicated over said network by the server device in response to the encrypted request message received at said server device;

program instructions to determine one or more of: a data size, a response time, a location information, or a character string of the received encrypted response message;

program instructions to receive, from the server, a plurality of encrypted response message candidates communicated over said network by the server device corresponding to a plurality of known encrypted request message candidates;

program instructions to determine one or more of a data size, a response time, a location information, or a character string of each of the received plurality of encrypted response message candidates; and program instructions to identify content of the encrypted request message by comparing the one or more of: the data size, the response time, the location information, or the character string of the encrypted response to the respective one or more of: the data size, the response time, the location information, or the character string of each of the plurality of encrypted response message candidates.

5. The non-transitory computer program product of claim 4, further comprising:

program instructions to receive, from the server, a further plurality of encrypted response messages communicated over said network by said server corresponding to a further plurality of encrypted request messages received at the service;

program instructions to determine one or more of: a data size, a response time, a location information, or a character string of each of the received further plurality of encrypted response messages; wherein the program instructions to identify content of the encrypted request message comprises:

program instructions to identify content of each of the further plurality of encrypted request messages by comparing one or more of: the data size, the response time, the location information, or the character string of each of the further plurality of encrypted response messages to the respective one or more of: the data size, the response time, the location information, or the character string of each of the plurality of encrypted response message candidates.

6. The non-transitory computer program product of claim 5: wherein the program instructions to determine at one or more computer processors of one or more of: a data size, a response time, a location information, or a character string of each of the received further plurality of encrypted response messages comprises:

program instructions to determine a first information about a first encrypted response message communicated over said network by the server device corresponding to a first encrypted request message received at said server device and a second information about a second encrypted response message communicated over said network by the server device corresponding to a second encrypted request message received at said server device, the first information and second information comprising one or more of: a data size, a response time, a location information, or a character string;

wherein the program instructions to identify the content of each of the further plurality of encrypted request messages comprises:

program instructions to identify a first content of the first encrypted response corresponding to the first encrypted request by comparing the first information about the first encrypted response message to the one or more of: a data size, a response time, a location information, or a character string of each of the plurality of encrypted response message candidates and identify a second content of the second encrypted response message corresponding to the second encrypted request message by comparing the second information about the second encrypted response message to the one or more of: a data size, a response time, a location information, or a character string of each of the plurality of encrypted response message candidates; and further comprising program instructions, stored on the one or more storage devices, to identify content that is included in both of the first content and the second content.

7. A computer system for identifying request content of an encrypted request message communicated over a network from a client device to a server device, the computer system comprising:

one or more computer processors; one or more storage devices; and program instructions, stored on the one or more storage devices for execution by the one or more computer processors, the program instructions comprising:

program instructions to receive, from a server, an encrypted response message communicated over said network by the server device in response to the encrypted request message received at said server device;

program instructions to determine one or more of: a data size, a response time, a location information, or a character string of the received encrypted response message;

program instructions to receive, from the server, a plurality of encrypted response message candidates communicated over said network by the server device corresponding to a plurality of known encrypted request message candidates;

program instructions to determine one or more of: a data size, a response time, a location information, or a character string of each of the received plurality of encrypted response message candidates; and program instructions to identify content of the encrypted request message by comparing the one or more of: the data size, the response time, the location information, or the character string of the encrypted response to the respective one or more of: the data size, the response time, the location information, or the character string of each of the plurality of encrypted response message candidates.

8. The computer system of claim 7, further comprising:

program instructions to receive, from the server, a further plurality of encrypted response messages communicated over said network by said server corresponding to a further plurality of encrypted request messages received at the service;

program instructions to determine one or more of: a data size, a response time, a location information, or a character string of each of the received further plurality of encrypted response messages; wherein the program instructions to identify content of the encrypted request message comprises:

program instructions to identify content of each of the further plurality of encrypted request messages by comparing one or more of: the data size, the response time, the location information, or the character string of each of the further plurality of encrypted response messages to the respective one or more of: the data size, the response time, the location information, or the character string of each of the plurality of encrypted response message candidates.

9. The computer system of claim 8, wherein the program instructions to determine at one or more computer processors of one or more of a data size, a response time, a location information, or a character string of each of the received further plurality of encrypted response messages comprises: program instructions to determine a first information about a first encrypted response message communicated over said network by the server device corresponding to a first encrypted request message received at said server device and a second information about a second encrypted response message communicated over said network by the server device corresponding to a second encrypted request message received at said server device, the first information and second information comprising one or more of: a data size, a response time, a location information, or a character string;

wherein the program instructions to identify the content of each of the further plurality of encrypted request messages comprises:

program instructions to identify a first content of the first encrypted response message corresponding to the first encrypted request message by comparing the first information about the first encrypted response message to the one or more of: the data size, the response time, the location information, or the character string of each of the plurality of encrypted response message candidates and identify a second content of the second encrypted response message corresponding to the second encrypted request message by comparing the second information about the second encrypted response message to the one or more of the data size, the response time, the location information, or the character string of each of the plurality of encrypted response message candidates; and further comprising program instructions, stored on the one or more storage devices for execution by at least one of the one or more computer processors, to identify content that is included in both of the first content and the second content.

* * * * *